United States Patent
Andon et al.

(10) Patent No.: US 10,621,644 B2
(45) Date of Patent: Apr. 14, 2020

(54) ONLINE PRODUCT RESERVATION SYSTEM

(71) Applicant: NIKE, Inc., Beaverton, OR (US)

(72) Inventors: Christopher Andon, Portland, OR (US); Hien Tommy Pham, Beaverton, OR (US); Chase Louis Taylor, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 74 days.

(21) Appl. No.: 15/004,531

(22) Filed: Jan. 22, 2016

(65) Prior Publication Data
US 2016/0343057 A1    Nov. 24, 2016

Related U.S. Application Data

(60) Provisional application No. 62/107,143, filed on Jan. 23, 2015.

(51) Int. Cl.
*G06Q 30/00* (2012.01)
*G06Q 30/06* (2012.01)
*G06F 16/9535* (2019.01)
*G06F 16/2457* (2019.01)
*G06Q 30/08* (2012.01)
*G06Q 10/02* (2012.01)
*G06Q 50/00* (2012.01)

(52) U.S. Cl.
CPC ... *G06Q 30/0631* (2013.01); *G06F 16/24578* (2019.01); *G06F 16/9535* (2019.01); *G06Q 10/02* (2013.01); *G06Q 30/08* (2013.01); *G06Q 50/01* (2013.01)

(58) Field of Classification Search
CPC .................................................... G06Q 30/00
See application file for complete search history.

(56) References Cited

U.S. PATENT DOCUMENTS 5,890,138 A  *  3/1999  Godin .................... G06Q 20/04
                                                        705/26.3
9,373,204 B1 *  6/2016  Moore, Jr. ......... G07C 9/00007
(Continued)

FOREIGN PATENT DOCUMENTS

JP     2002163570 A     6/2002
JP     2005527917 A     9/2005
(Continued)

OTHER PUBLICATIONS

How to Enter the Finish Line Draft. (Dec. 7, 2012). Retrieved from https://www.facebook.com/notes/finish-line/how-to-enter-the-finish-line-draft/10152317521800858/. (Year: 2012).*

(Continued)

*Primary Examiner* — Abby J Flynn
(74) *Attorney, Agent, or Firm* — Banner & Witcoff, Ltd.

(57) ABSTRACT

Systems and methods for reserving products, events, or services that have limited availability are provided. A product reservation system may be used to announce the availability of limited availability products. The announcements may be at times unknown to consumers. Consumers may participate in a product drawing session to submit one or more reservation requests for limited availability products being offered during the session.

20 Claims, 27 Drawing Sheets

(56) References Cited

U.S. PATENT DOCUMENTS

| | | | | |
|---|---|---|---|---|
| 2002/0147655 | A1* | 10/2002 | Say | G06Q 30/0609 |
| | | | | 705/26.3 |
| 2003/0135458 | A1* | 7/2003 | Tadano | G06Q 10/02 |
| | | | | 705/40 |
| 2003/0167295 | A1* | 9/2003 | Choo | G06F 9/4868 |
| | | | | 718/104 |
| 2004/0210489 | A1* | 10/2004 | Jackson | G06Q 10/087 |
| | | | | 705/22 |
| 2004/0215526 | A1* | 10/2004 | Luo | G06Q 30/06 |
| | | | | 705/26.1 |
| 2005/0004818 | A1* | 1/2005 | Liman | G06Q 10/02 |
| | | | | 705/5 |
| 2007/0105612 | A1* | 5/2007 | Fotevski | G07F 17/32 |
| | | | | 463/16 |
| 2008/0249895 | A1* | 10/2008 | Mariotti | G06Q 10/02 |
| | | | | 705/5 |
| 2009/0076903 | A1* | 3/2009 | Schwarzberg | G06F 19/3475 |
| | | | | 705/14.19 |
| 2009/0248516 | A1* | 10/2009 | Gross | G06F 17/30899 |
| | | | | 705/14.66 |
| 2010/0262474 | A1* | 10/2010 | Forlai | G06Q 10/06375 |
| | | | | 705/14.13 |
| 2010/0312587 | A1* | 12/2010 | Benson | G06Q 10/02 |
| | | | | 705/5 |
| 2012/0143685 | A1* | 6/2012 | Miller | G06Q 30/0254 |
| | | | | 705/14.52 |
| 2012/0158589 | A1* | 6/2012 | Katzin | G06Q 20/12 |
| | | | | 705/44 |
| 2013/0204737 | A1* | 8/2013 | Agarwal | G06Q 30/0282 |
| | | | | 705/26.7 |
| 2013/0282437 | A1 | 10/2013 | Cooke et al. | |
| 2013/0290080 | A1* | 10/2013 | Pacholke | G06Q 30/0601 |
| | | | | 705/14.4 |
| 2013/0290134 | A1* | 10/2013 | Pacholke | G06O 30/0601 |
| | | | | 705/26.8 |
| 2014/0228088 | A1* | 8/2014 | Katz | G07F 17/326 |
| | | | | 463/17 |
| 2015/0058119 | A1* | 2/2015 | Atli | G06Q 30/0276 |
| | | | | 705/14.49 |
| 2015/0213496 | A1* | 7/2015 | McDevitt | H04W 4/021 |
| | | | | 705/14.58 |
| 2015/0213680 | A1* | 7/2015 | Skoler | G07F 17/3244 |
| | | | | 463/25 |
| 2015/0262499 | A1* | 9/2015 | Wicka | G06Q 50/22 |
| | | | | 705/14.27 |

FOREIGN PATENT DOCUMENTS

| | | |
|---|---|---|
| JP | 2014135026 A | 7/2014 |
| KR | 20050001121 A | 1/2005 |
| KR | 20110098118 A | 9/2011 |
| KR | 20130011257 A | 1/2013 |
| KR | 20140127945 A | 11/2014 |

OTHER PUBLICATIONS

NNNike Implements New "Twitter RSVP" Release System (Apr. 17, 2012), Retrieved from http://www.nicekicks.com/nike-impliments-twitter-rsvp-release-system/ (Year: 2012).*

Apr. 29, 2016—(WO) ISR & WO—App. No. PCT/US16/14244.

* cited by examiner

ONLINE PRODUCT RESERVATION SYSTEM

CROSS-REFERENCE TO RELATED APPLICATIONS

The present application claims the benefit of and priority to U.S. Provisional Patent Application No. 62/107,143 filed Jan. 23, 2015 and entitled "Online Product Reservation System," the contents of which are expressly incorporated herein by reference in their entirety for any and all non-limiting purposes.

BACKGROUND

It is common for stores to sell products that have limited availability. For example, a company or store may produce a limited edition product that will be sought after by collectors. Stores selling new products that are part of an initial product offering may also find that there are more consumers than products available. Consumers seeking products that have limited availability may wait in lines at brick and mortar stores for extended time periods. Some consumers may spend several hours camped outside of a store prior to the store opening in hopes of obtaining a product with limited availability. Similar issues may occur when consumers try to make reservations for events or services.

Standing in long lines in hopes of obtaining a product with limited availability can result in a negative shopping experience for consumers. This is particularly true when consumers wait outside of brick and mortar stores during inclement weather. Of course, some consumers will leave without a product even after waiting. A negative shopping experience can result in consumers not wanting to purchase products from a particular store or manufacturer in the future.

Therefore, there is a need in the art for improved systems and methods for matching products having limited availability with consumers.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Systems and methods for reserving products, services and/or events that have limited availability are provided. A social networking service may be used to announce the availability of reservations for and/or the release date(s) of limited availability products, events and/or services. The announcements may be at times unknown to consumers. Consumers may respond to the announcements via the social networking service. The announcement may include a link to a website where the user may participate in a drawing for the limited availability product, event, and/or service. The user may be required to provider certain information, such as payment and product preference information, after being directed to the website.

In some aspects of the disclosure herein, consumers may have a limited amount of time to participate in the drawing and submit reservation requests. For example, consumers may only be permitted to submit reservation requests within 10 minutes after the start of the drawing. In other aspects of the disclosure herein, consumers may only win the drawing if a product, event or service is available. For example, if only 50 products are available, only 50 consumers that submitted a reservation request will have an opportunity to win the drawing.

Some embodiments can be partially or wholly implemented on a computer-readable medium, for example, by storing computer-executable instructions or modules, or by utilizing computer-readable data structures. Of course, the methods and systems of the above-referenced embodiments may also include other additional elements, steps, computer-executable instructions, or computer-readable data structures.

The details of these and other embodiments are set forth in the accompanying drawings and the description below. Other features and advantages will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure. Further, headings within this disclosure should not be considered as limiting aspects of the disclosure. Those skilled in the art with the benefit of this disclosure will appreciate that the example embodiments are not limited to the example headings.

Figure 1:
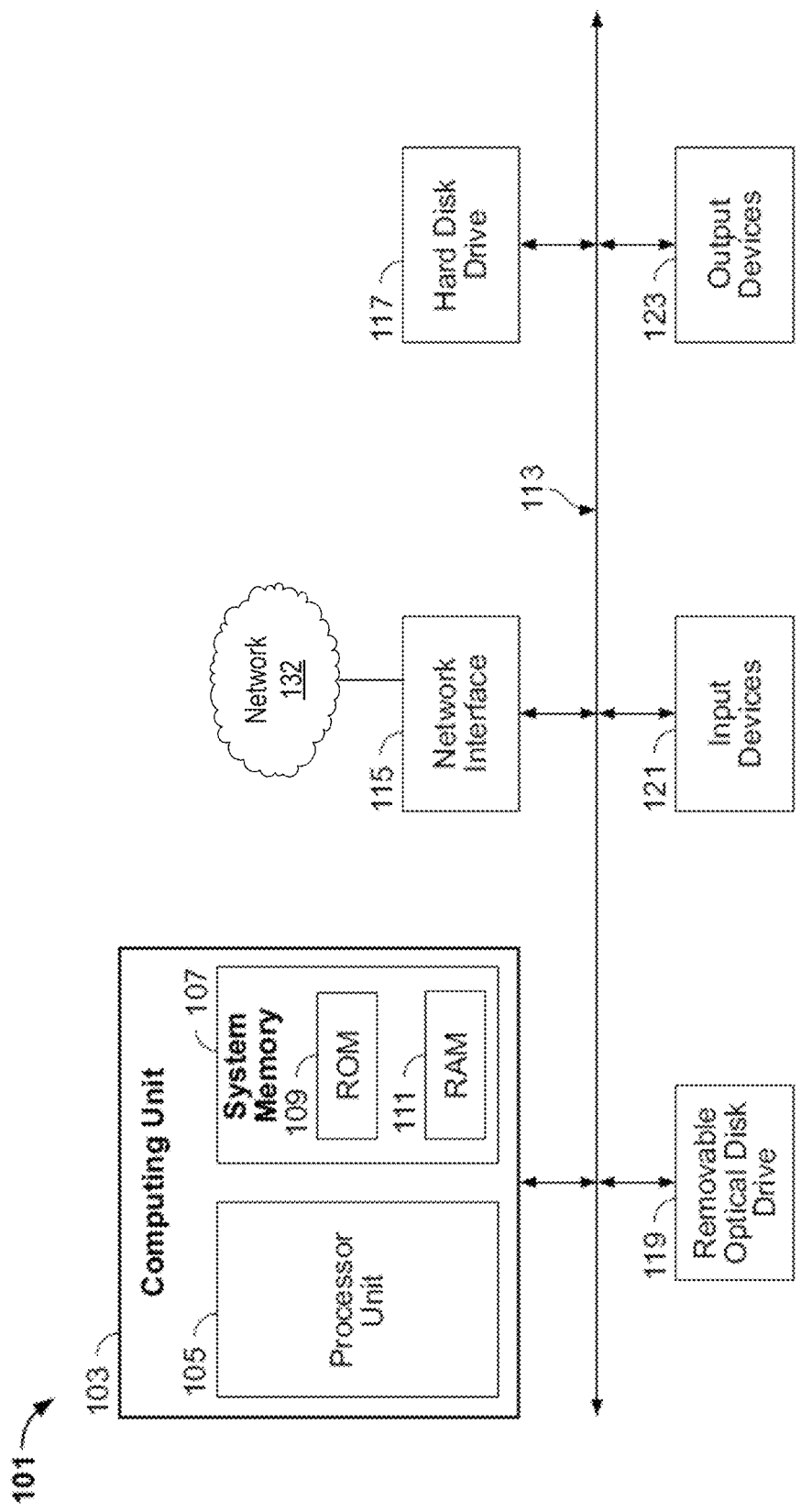
FIG. 1 illustrates an example computing device that may be used to implement aspects of the disclosure.

FIG. 1 illustrates an exemplary computer 101 that may be used to implement aspects of the disclosure. Computer 101 may include computing unit 103, which may comprise at least one processing unit 105. Processing unit 105 may be any type of processing device for executing software instructions, such as for example, a microprocessor device. Computer 101 may include a variety of non-transitory computer readable media, such as memory 107. Memory 107 may include, but is not limited to, random access memory (RAM) such as RAM 111, and/or read only memory (ROM), such as ROM 109. Memory 107 may include any of: electronically erasable programmable read only memory (EEPROM), flash memory or other memory technology, CD-ROM, digital versatile disks (DVD) or other optical disk storage, magnetic storage devices, or any other medium that can be used to store the desired information and that can be accessed by computer 101.

The processing unit 105 and the system memory 107 may be connected, either directly or indirectly, through a bus 113 or alternate communication structure to one or more peripheral devices. For example, the processing unit 105 or the system memory 107 may be directly or indirectly connected to additional memory storage, such as a hard disk drive 117, a removable magnetic disk drive, an optical disk drive 119, and a flash memory card. The processing unit 105 and the system memory 107 also may be directly or indirectly connected to one or more input devices 121 and one or more output devices 123. The output devices 123 may include, for example, a display device, television, printer, stereo, or speakers. In some embodiments one or more display devices may be incorporated into eyewear. The display devices incorporated into eyewear may provide feedback to users. Eyewear incorporating one or more display devices also provides for a portable display system. The input devices 121 may include, for example, a keyboard, touch screen, a remote control pad, a pointing device (such as a mouse, touchpad, stylus, trackball, or joystick), a scanner, a camera or a microphone.

Computer 101, computing unit 103, and/or any other electronic devices may be directly or indirectly connected to one or more network interfaces, such as example interface 115 for communicating with a network, such as network 132. In the example of FIG. 1, network interface 115, may comprise a network adapter or network interface card (NIC) configured to translate data and control signals from the computing unit 103 into network messages according to one or more communication protocols, such as the Transmission Control Protocol (TCP), the Internet Protocol (IP), and the User Datagram Protocol (UDP). These protocols are well known in the art, and thus will not be discussed here in more detail. An interface 115 may employ any suitable connection agent for connecting to a network, including, for example, a wireless transceiver, a power line adapter, a modem, or an Ethernet connection. Network 132, however, may be any one or more information distribution network(s), of any type(s) or topology(s), alone or in combination(s), such as internet(s), intranet(s), cloud(s), LAN(s). Network 132 may be any one or more of cable, fiber, satellite, telephone, cellular, wireless, etc. Networks are well known in the art, and thus will not be discussed here in more detail. Network 132 may be variously configured such as having one or more wired or wireless communication channels to connect one or more locations (e.g., schools, businesses, homes, consumer dwellings, network resources, etc.), to one or more remote servers, or to other computers, such as similar or identical to computer 101. Indeed, the system may include more than one instance of each component (e.g., more than one computer 101, more than one display, etc.).

Regardless of whether computer 101 or other electronic device within network 132 is portable or at a fixed location, it should be appreciated that, in addition to the input, output and storage peripheral devices specifically listed above, the computing device may be connected, such as either directly, or through network 132 to a variety of other peripheral devices, including some that may perform input, output and storage functions, or some combination thereof.

Figure 2:
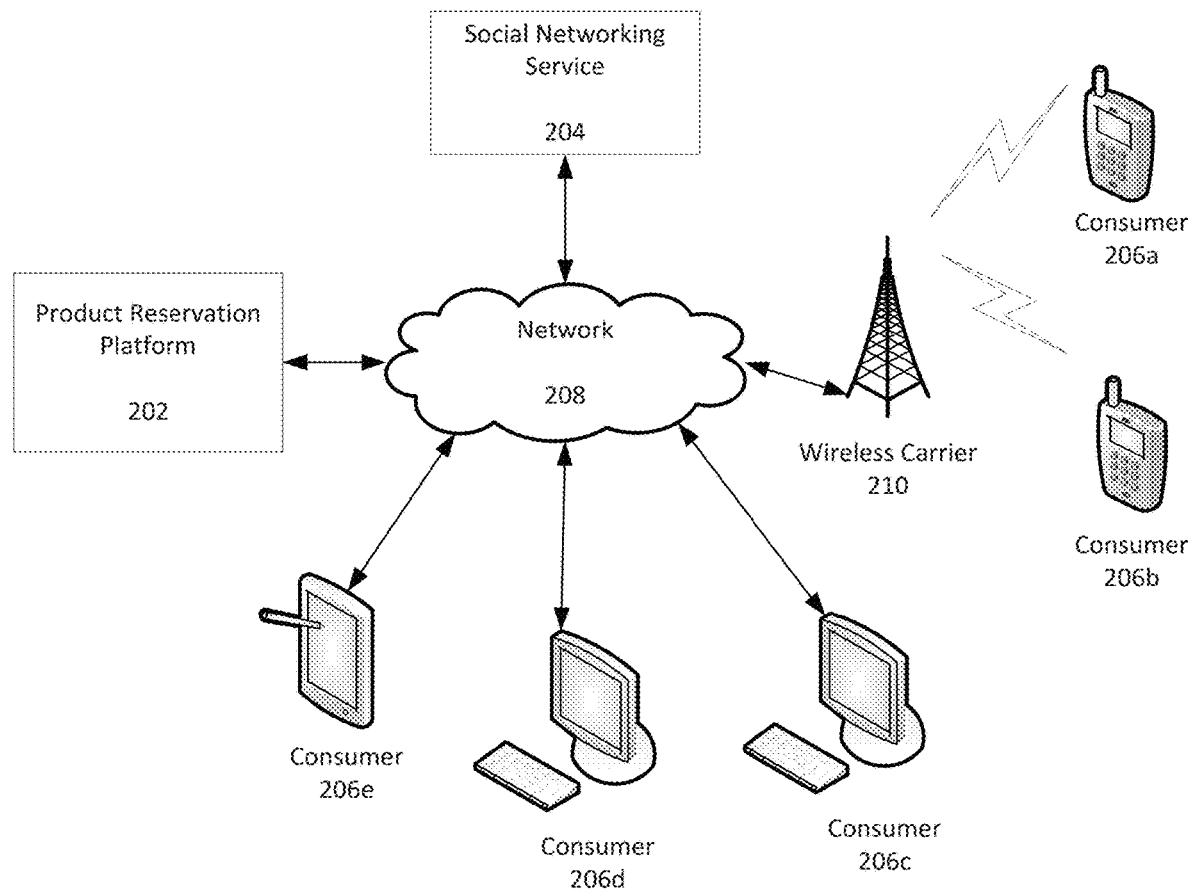
FIG. 2 illustrates an infrastructure that may be used to implement a product reservation system in accordance with an example embodiment.
Figure 2:
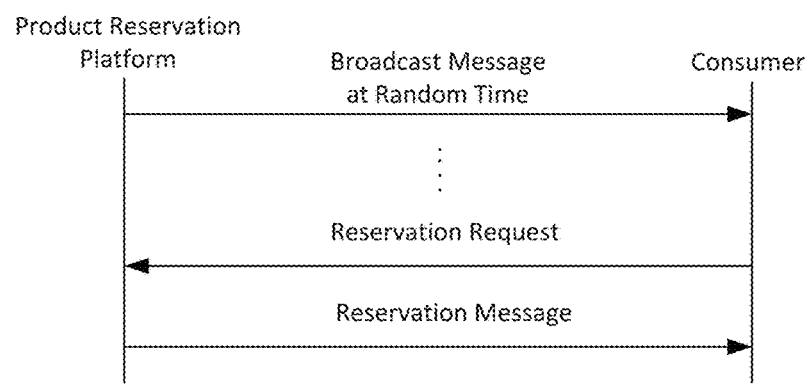

FIG. 2 illustrates an infrastructure that may be used to implement a product reservation system in accordance with an example embodiment. A product reservation platform 202 may be used to generate messages and process requests. Product reservation platform 202 may be hosted on a server operated by an entity, such as store or company. Product reservation platform 202 may use a social networking service 204 to broadcast messages to consumers 206a-206e. Exemplary social networking services include Twitter, Facebook and Google+. In some embodiments, social networking service 204 may be used to both broadcast messages to a plurality of consumers and exchange messages with individual consumers. Twitter, for example, allows users to create Tweets that are broadcasted to all followers of the Tweet source. Twitter also allows parties to exchange direct messages that are not shared with other followers, e.g., via direct message. The broadcasting and exchanging of messages may occur over a wide area network 208, such as the Internet. Communication links may also include one or more wireless carriers, such as wireless carrier 210. Some embodiments may include a wireless carrier connected to a wide area network.

Consumers may use a variety of devices to receive broadcast messages and exchange messages. Mobile terminals 206a and 206b may be implemented with smart phones and connect to wide area network 208 via wireless carrier 210. Desktop computers 206c and 206d may connect to wide area network 208 via an Ethernet connection or other conventional connection. Tablet device 206e may connect to wide area network 208 using WiFi or any other conventional wireless protocol.

As shown in FIG. 2, product reservation platform 202 may broadcast a message announcing the availability of a limited availability product to multiple consumers. The time of the broadcast may be a random or pseudo-random time selected by a computer device. Alternatively, the time of the event may also be selected by an event or launch planner. The time of the broadcast could be known by some people, but not the intended recipients, such as the consumers. The broadcast message may include a link to a web site offering the exclusive product, event or service. For example, a hyperlink included in the broadcast message may direct the consumer to a website (e.g., a website of the entity offering the exclusive product, event, and/or service) where the consumer may participate in a drawing for the exclusive product, event, and/or service. After receiving the broadcast message, a consumer may respond by selecting the link contained in the message to be directed to the website hosting the drawing and to continue the product reservation process. In some aspects of the disclosure herein, product reservation platform 202 may receive a notification indicating that a consumer has responded to the broadcast message. The notification transmitted to the product reservation platform may include user information, such as a username or some other unique identifier, such that the product reservation platform may track the one or more consumers responding to the broadcast message.

As will be described in more detail below, consumers may participate in a drawing for exclusive products, events, and/or services by submitting reservation requests to product reservation platform 202 via a website. Product reservation platform 202 may be configured to receive multiple reservation requests from multiple users simultaneously. In some embodiments, product reservation platform 202 may process reservation requests on a first come first serve basis. In some aspects of the disclosure herein, product reservation platform 202 may receive a predetermined number of reservation requests prior to processing the received reservation requests. For example, the product reservation platform may wait to begin processing reservation requests until a minimum number of reservation requests have been submitted. In other aspects of the disclosure herein, product reservation platform 202 may only accept reservation requests from consumers within a predetermined time frame or window. For example, the product reservation platform may only accept reservation requests from consumers for a 10 minute time window at a predetermined time of day and on a predetermined date. The date and time at which the drawing will be held for an exclusive product (e.g., date and time when the product reservation platform may begin accepting reservation requests for that product) may be provided within the broadcast message transmitted to consumers. In other example embodiments, the duration of the drawing may be provided within the broadcast message transmitted to consumers.

In some embodiments, after a user has submitted a reservation request, product reservation platform 202 may be configured to transmit a message (e.g., text, email, etc.) to the consumer indicating that their reservation request has been received. After the close of a drawing session, the product reservation platform may process submitted reservation requests to determine which users will be given an opportunity to purchase the exclusive product, event, or service (e.g., determine which users have won the drawing). There are a variety of ways in which the product reservation platform may determine which users will win a drawing. For example, as will be described in greater detail below, the product reservation platform may rank reservation requests submitted by users, with the highest ranked users wining the drawing. In some instances, the product reservation platform may rank reservations requests based on various types of information, such as information included in the reservation request, information stored in an account associated with the consumer, and the like.

As another example, the product reservation platform may randomly select users from the plurality of users that submitted a reservation request for a particular product. The product reservation platform may randomly select a predetermined number of users based on the number of exclusive products available. In some aspects of the disclosure herein, the product reservation system may segregate users submitting reservation requests into different groups prior to the random selection. For example, the product reservation platform may group users based on geographic location (e.g., zip code), preferred delivery locations, or other information accessible from the user's account or included within a reservation request. The product reservation platform may utilize such information to narrow the pool of users to select from when identifying winners of the random selection. For example, the product reservation platform may restrict the drawing for exclusive products available at a particular store to those users that have identified the store as their preferred delivery location when submitting their reservation request.

As yet another example, the product reservation platform may restrict the drawing for exclusive products available at a particular store to those users that live within a threshold proximity of that store (e.g., 10 miles, 50 miles, etc.). In this example, the product reservation platform may compare the location of the store with user location information (e.g., zip code, mailing address, etc.) prior to randomly selecting the winners of the drawing. After processing reservation requests and identifying the winners of the drawing, the product reservation platform may transmit a message to the users who were able to successfully reserve a right to purchase the exclusive product (e.g., users who won the drawing). Additionally, or alternatively, the product reservation platform may transmit a message to consumers who were unable to reserve the product.

Product reservation platform 202 may perform a variety of functions associated with a marketing campaign. For example, the platform may be used to capture and implement launch details as well as compose and schedule social media broadcast messages to consumers. The platform may also be used to track reservation confirmations and reservation failures, and provide overall reservation analytics. Product reservation platform 202 may also contain logic that will prevent abuse of the reservation process, such as setting reservation request and/or product purchase limits (e.g., 1 per person); issuing reservation codes; and capturing/storing information for consumers to verify at the point of pick-up and purchase, etc. Product reservation platform 202 may also have integrations with customer data management systems that will support highly targeted segmentation of announcement messages. A loyalty program may be started where consumers pre-register for product launches and identify preferred product attributes and/or interests.

Figure 3:
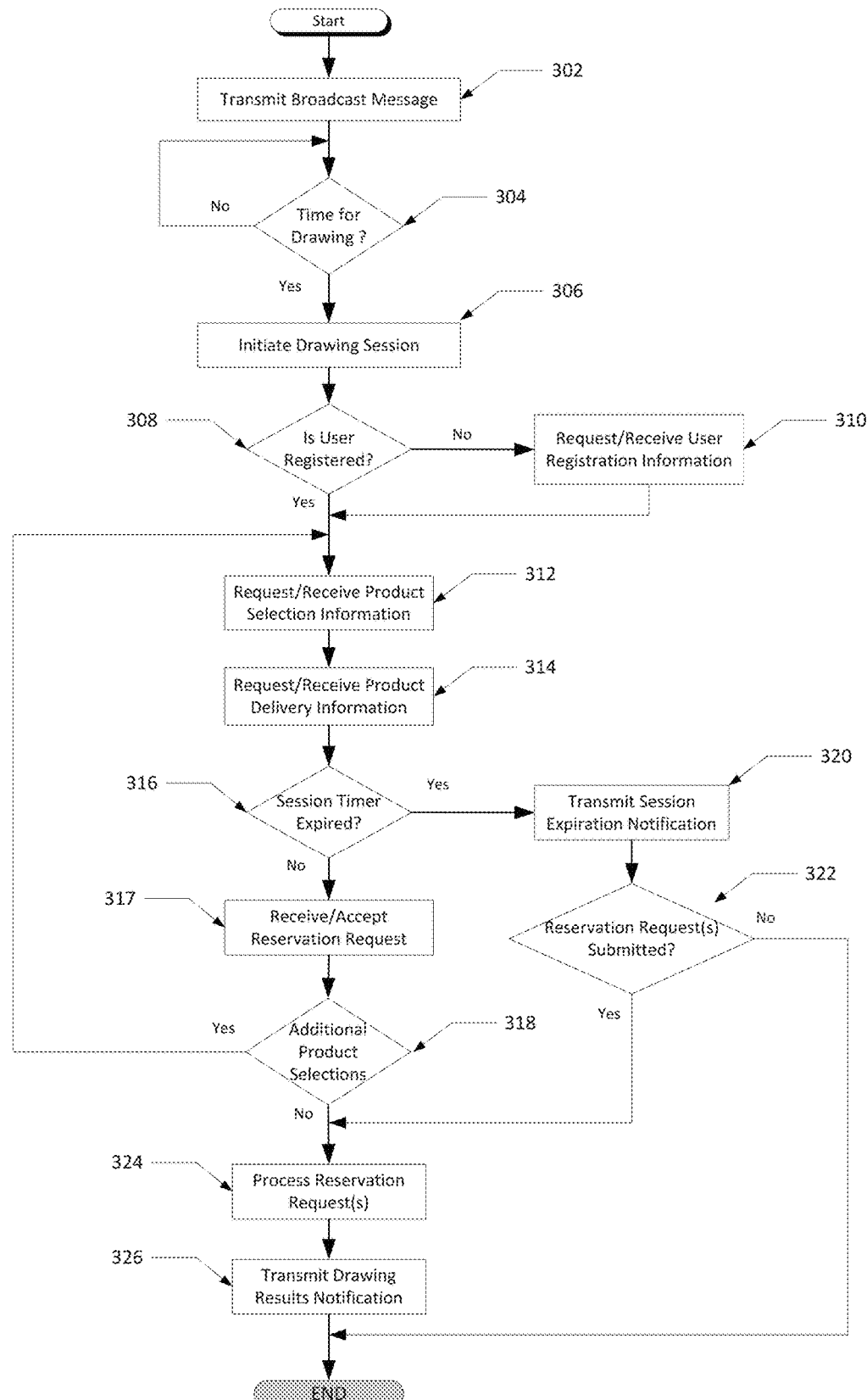
FIG. 3 illustrates a product reservation process in accordance with an example embodiment.

FIG. 3 illustrates a product reservation process in accordance with an example embodiment. In various embodiments some or all of the steps shown in FIG. 3 may be implemented by product reservation platform 202 shown in FIG. 2. First in step 302, a message source broadcasts to a plurality of consumers a message announcing the start of a drawing for an exclusive product. The broadcast message may be sent via a social networking service. The broadcast may occur during a previously announced time period and at a specific time within the time period that is unknown to the plurality of consumers. For example, an entity (e.g., manufacturer of the product, a retail store, etc.) may inform consumers that they will broadcast a message announcing the availability of a drawing for a product on a certain day and at a certain time. The entity may then transmit the broadcast message at a random or pseudo-random time during the day of the drawing or at any other time prior to the drawing. Alternatively, the entity may transmit the message at a predetermined time that is not known to the consumers. The product reservation system may also broadcast a reminder message prior to broadcasting the message announcing the product drawing.

In some embodiments, the broadcast message may identify information necessary for a user to participate in the product drawing. The needed information may include a unique code or phrase that a user may be required to provide when participating in the product drawing and when submitting a reservation request. In other embodiments, the broadcast message may identify product information relating to the exclusive product being offered. For example, the message may include a product name, product color-ways, product sizes, and any other information used to describe the exclusive products being made available during the drawing. The message may also identify a website hosting the drawing where the user may submit reservation requests. For example, the broadcast message may include a hyperlink to a website where the user may participate in the product drawing. One or more advertising messages may also be transmitted during the previously announced time period and prior to broadcasting the message announcing the start of the drawing.

The product reservation system may selectively transmit (e.g., broadcast) communications indicating an opportunity to reserve/and or buy an exclusive product based on information stored in a user's online community account. There are various ways in which the system may selectively transmit communications to users based data (e.g., athletic activity data) stored in the user's online community account (e.g., Nike profile/account) without departing from the scope of the present disclosure. For example, the system may selectively transmit (e.g., broadcast) communications via a social networking website (e.g., a Tweet, post, etc.) to users that have achieved one or more athletic activity milestones. As another example, the system may selectively transmit communications to users that have exceeded a threshold level of athletic activity (e.g., earned a threshold level of athletic activity points, burned a threshold number of calories, etc.). In some embodiments, the product reservation system may selectively transmit (e.g., broadcast) communications to users based on product preferences and other user preferences stored in the user's online community account or profile.

In other example embodiments, the product reservation system may selectively transmit (e.g., broadcast) communications to users based on a location of the user. Many exemplary computing devices devices (e.g., mobile computing devices) contain a global positioning system (GPS) receiver that permits GPS satellites to identify the geographic location of the mobile computing device. Oftentimes, a user may carry the mobile computing device on their person and thus GPS is able to identify the location of the user through this method. The ability to track a user's location is useful in commerce. For example, as will be discussed in more detail below, the user may be offered location-specific information regarding upcoming drawing sessions offering products, events or services that are local to the geographic area in which the user is located. Further, the user's location may be calculated by any means other than GPS. GPS location tracking is a feature that is commonly incorporated into mobile computing devices and thus lends itself well to inclusion in the methods and systems described herein. In some embodiments, the product reservation system may selectively transmit (e.g., broadcast) communications to users regarding an upcoming drawing based on the geographic location of the user. For example, the product reservation system may transmit a communication to registered users residing or located in a particular geographic region regarding a drawing for tickets to a local sporting event. As another example, the product reservation system may transmit a communication to registered users residing or located in a particular city regarding a drawing for an exclusive footwear product signed by a local athlete.

Accordingly, the product reservation system may selectively target particular users to offer opportunities to reserve and/or purchase exclusive products prior to those products becoming available to the general public. The product reservation system may selectively target particular users to offer opportunities to reserve and/or purchase exclusive products based on information collected by the system, such as the number and/or type of products for which a user has previous submitted reservation requests (e.g., reservation request history). Additionally or alternatively, the product reservation system may utilize a user's reservation request history to generate product recommendations for the user. For example, if the product reservation determines that the user has submitted multiple reservation requests for footwear products within a particular time period, the product reservation system may determine one or more common characteristics, features, and/or attributes among the footwear products associated with the reservation requests submitted by the user. For example, with respect to footwear products, the product reservation system may collect and store various types of information regarding the attributes and/or characteristics of each footwear product offered to users, such as color information, product type information (e.g., mid, lo, high-top, etc.), product material information, product personalization information (e.g., content, size, location, color, etc.), logo information (e.g., size, brand, location, etc.), performance attributes (breathability, stiffness, etc.). The product reservation system may utilize this information to recommend other footwear products to the user that may have similar characteristics, features, and/or attributes. Any number of product characteristics, features, and/or attributes may be considered and processed by the product reservation system when generating product recommendations for a user without departing from the scope of the present disclosure.

In other aspects of the disclosure herein, the product reservation system may selectively transmit (e.g., broadcast) communications indicating a goal, challenge, or task that a user must complete prior to receiving the opportunity to reserve/and or buy an exclusive product. Challenges may include one or more goals that are to be completed in a specified time frame. A challenge may be won by completing the challenge in the fastest time, performing the most steps in the allotted time, burning the most calories, earning the most activity points (or FUEL), etc. There are variety of goals, challenges, or tasks that a user may be asked to complete prior to receiving the opportunity to reserve/and or buy an exclusive product without departing from the scope of the present disclosure. For example, a user may be required to obtain a certain number of athletic activity points or register a certain number of hours played on a particular video before being granted access to participate in a drawing. The entity offering the exclusive product may partner with advertisers or other third-parties to determine the one or more tasks that a user must complete. Upon completing the specified goal or task, the user may be provided with a unique code that must be re-entered at the website hosting the drawing in order to participate in the drawing.

In some aspects of the present disclosure, a first user (or group of users) may challenge a second user (or group of users) for the opportunity to participate in a product drawing session. The product reservation system may provide or be operatively connected to a module, an interface, dashboard, etc. for challenging other registered users. In some example embodiments, a user may challenge one or more other users via an interface (or website) provided by the user's online community account (e.g., Nike profile/account). The user may be prompted to provide specified parameter for the challenge, such as the type of activity, the starting date of the challenge, the amount of activity required to win the challenge, the other users participating in the challenge, etc. After the participants of the challenge have been identified, and the challenge has been created, the participants may utilize athletic monitoring devices to collect athletic data during the challenge. The collected athletic data for each participant may aggregated and stored in each user's online community account.

For example, if the challenge is a race to determine who can be the first to run 100 miles, for each participant the athletic activity data may be collected and displayed via an interface on the user's online community account. The interface may display the sum of the total distance values completed (e.g., miles completed) by a participant based on athletic activity data collected for that participant after the challenge start date. In some aspects of the disclosure herein, the interface may show each participant's progress toward the goal of the challenge (e.g., using a bar graph). When a participant has a sum of his or her total distance values that matches or exceeds the specified challenge distance (and is the first user to do so), then the product reservation system may identify that participant as the winner of the challenge. In some embodiments, the winner of the challenge may be provided with a reward, such as a higher user ranking in the online community, access to a product drawing session, etc. The winner of the challenge may be provided with various types of awards without departing from the scope of the disclosure herein.

In other example embodiments, the product reservation system may selectively transmit (e.g., broadcast) communications to particular groups of users indicating the opportunity to participate in a drawing session. For example, the product reservation system may selectively transmit (e.g., broadcast) communications to a group of users participating in a particular sporting event or other activity. Participants in the sporting event (e.g., marathon, race, etc) may register for the event and indicate in an online community account/profile that they will be participating in the event. The product reservation system may be configured to determine whether a particular user is registered for and/or will be participating in the sporting event based on data contained within the user's account/profile. Accordingly, the product reservation system may identify several users participating in the same sporting activity and may selectively transmit a message to those users. As another example, the product reservation system may selectively transmit (e.g., broadcast) communications to a group of users that have yet to win a product drawing. In this example, product reservation system may be configured to determine whether a particular user has previously won a product drawing based on historical reservation request data collected by the system.

Next, in step 304 the product reservation system may determine whether a particular drawing should be initiated. The product reservation system may compare the predetermined start time for a drawing (e.g., a product drawing session) to the current time in order to determine whether to initiate the product drawing session. In some embodiments, the product reservation system may display on a website (or other user interface) a clock or timer that displays an amount of time remaining prior to the start of the drawing. If the product reservation system determines that it is not yet time to initiate the product drawing session (e.g., too early to start the drawing), the system may continue to wait until the predetermined date and/or time for initiating the drawing.

If the product reservation system determines that it is time to initiate the drawing, the method may proceed to step 306 where the product reservation system may initiate the drawing session for one or more exclusive products, events, and/or services. The product reservation system may provide users with various interfaces for participating in the drawing session and submitting reservation requests. For example, the product reservation system may be operably connected to or in communication with web servers hosting a website for the drawing. During step 306, the product reservation system may transmit a message to the user, (e.g., via the website or some other interface), indicating the start of the product drawing session. Additionally or alternatively, the product reservation system may transmit a message indicating the start of the product drawing session to one or more computing devices or communication addresses associated with a user (or user account). For example, the product reservation system may transmit a message to a user's mobile computing device. As another example, the product reservation system may transmit a message to an email address or social networking account associated with the user.

In some aspects of the disclosure herein, the product reservation system may set a response time period (e.g., 10 minutes, 30 minutes, or any other desired time period) in which users must submit reservation requests. The product reservation system may, for example, only accept product reservation requests received within the response time period. In some example embodiments, at the start of the product drawing session, the product reservation system may initiate a session timer (or clock) indicating an amount of time remaining before the end of the product drawing session. For example, if the product drawing session lasts 10 minutes (e.g., the user has 10 minutes to complete reservation requests for exclusive products), the session timer may countdown from 10 minutes to 0 minutes to indicate the amount of time remaining before the product drawing session ends.

At step 308, the product reservation system may determine whether a user attempting to submit a reservation request is a registered user. During step 308, the product reservation system may determine whether the user has previously registered a user account with the entity offering the exclusive product. In other aspects of the disclosure herein, the product reservation system may compare credentials (e.g., username, password, etc.) provided by the user with a database of registered user credentials to determine whether the user has previously registered and/or created a user account with the product reservation system. If the user is a registered user, the method may proceed to step 312. If the user is not a registered user, the method may proceed to step 310, wherein the product reservation system may prompt the user to provide information for establishing a user account. As discussed above, the product reservation system may provide various webpages (or interfaces) such that the user may participate in the product drawing session. The product reservation system may provide the user with a registration interface for inputting user registration information. For example, the product reservation system may request the user's contact information, a username, a password, and email address, and other similar user information in order to create and register the user account.

Figure 10A:
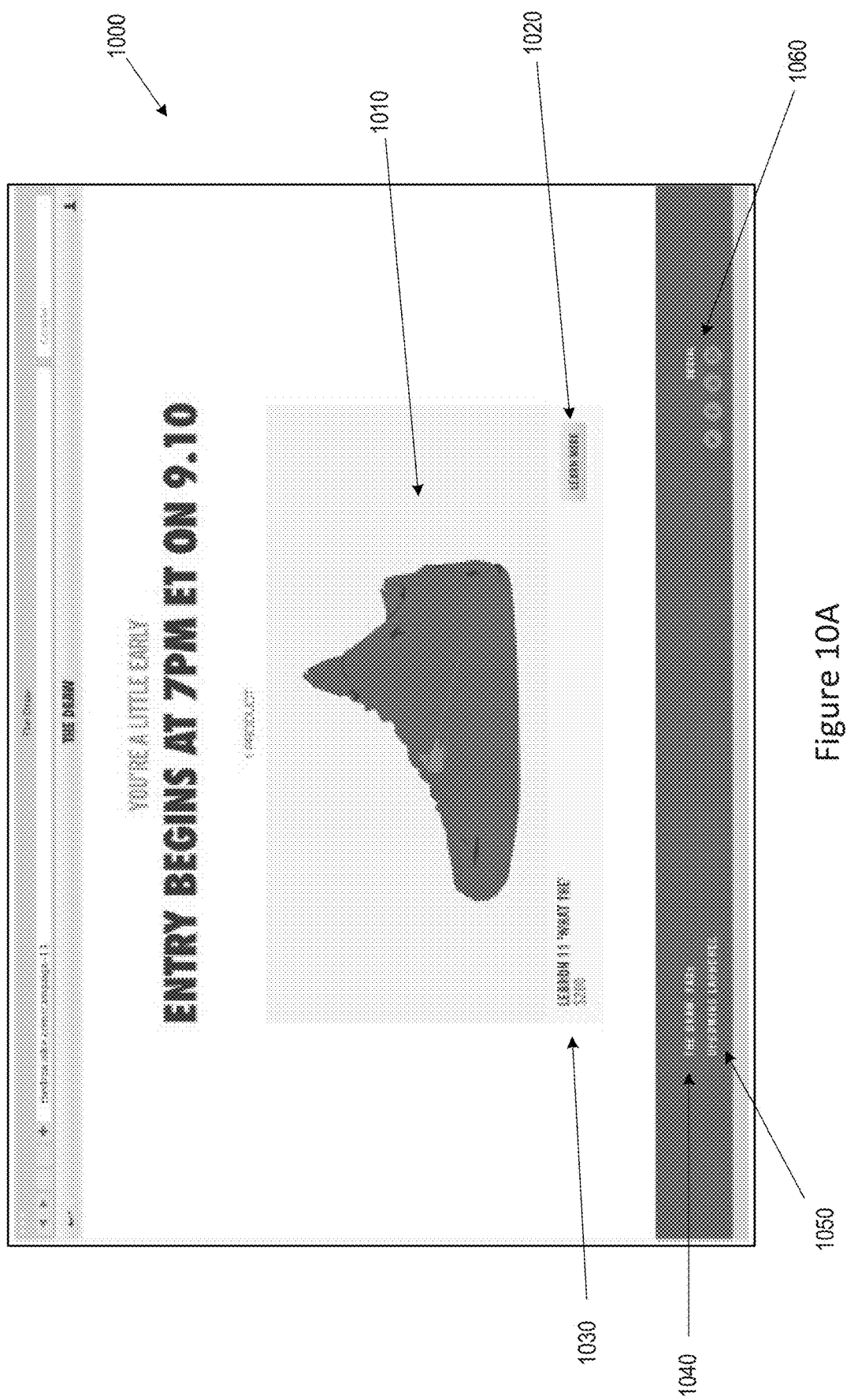
FIGS. 10A-10B and 11 illustrate example user interface screens for an on-line reservation system in accordance with aspects of the disclosure.
Figure 10B:
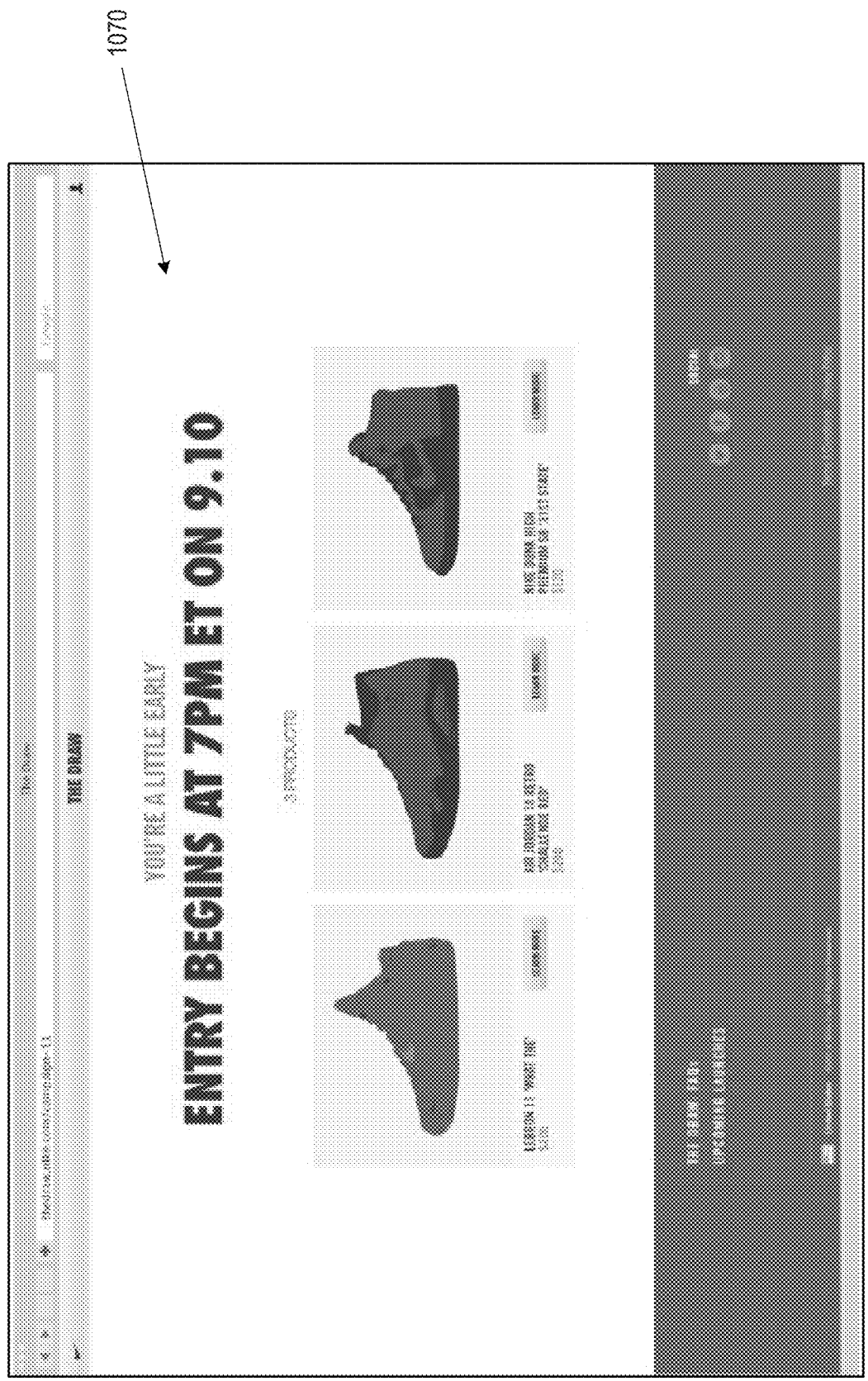
Figure 11:
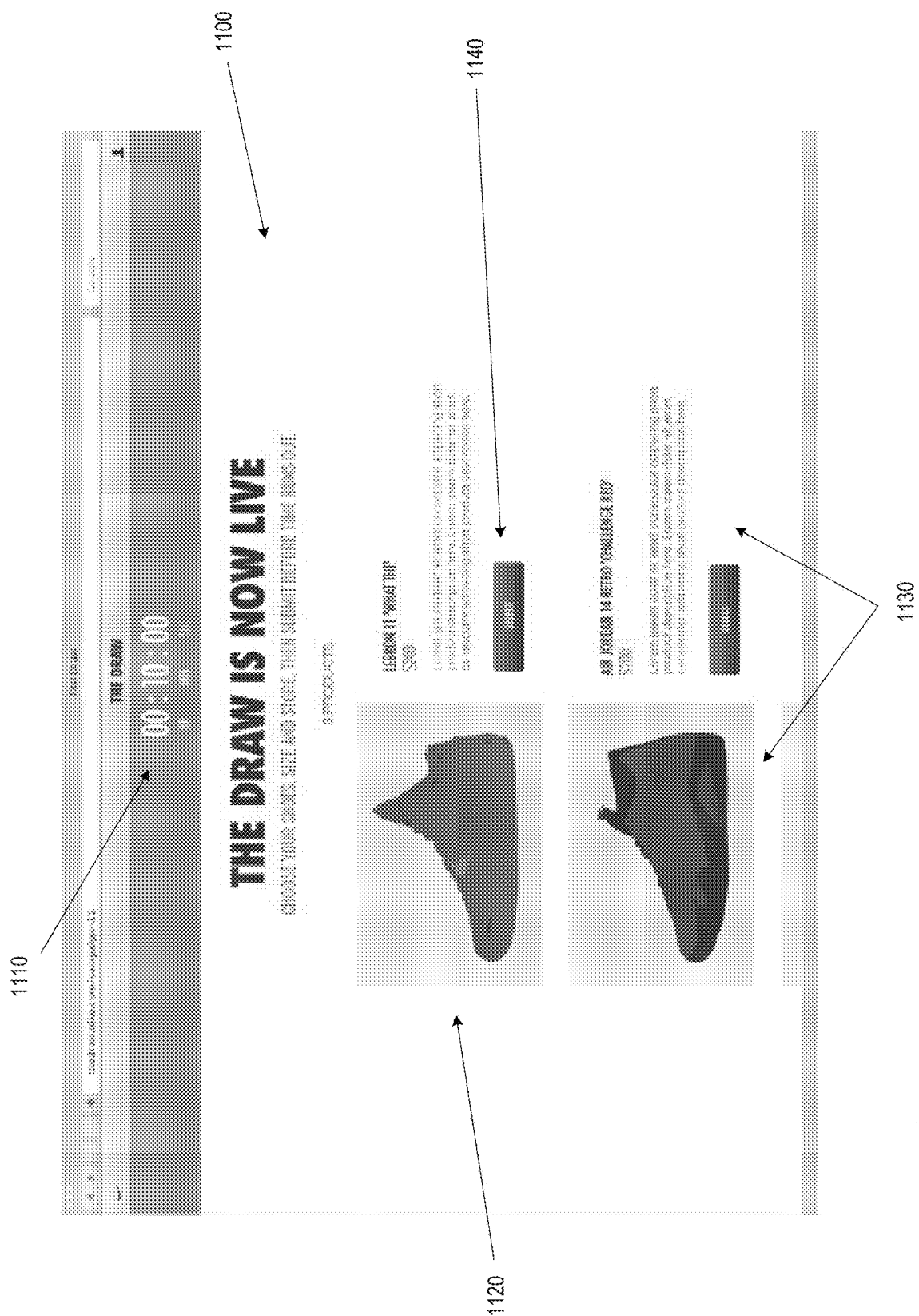

At step 312, the product reservation system may receive user input indicating a particular product for which the user desires to submit a reservation request. As illustrated in FIGS. 10A-B & 11 and as described in greater detail below, in some aspects of the disclosure herein, the product reservation system may display images of the various products being offered during the drawing. During step 312, the product reservation system may receive user input selections, via the provided interface(s), indicating product details for the product selected by the user. For example, a user may be provided with one or more interface elements (e.g., menus, drop-down lists, etc.), for indicating a desired product size, product color, and the like.

Figure 13:
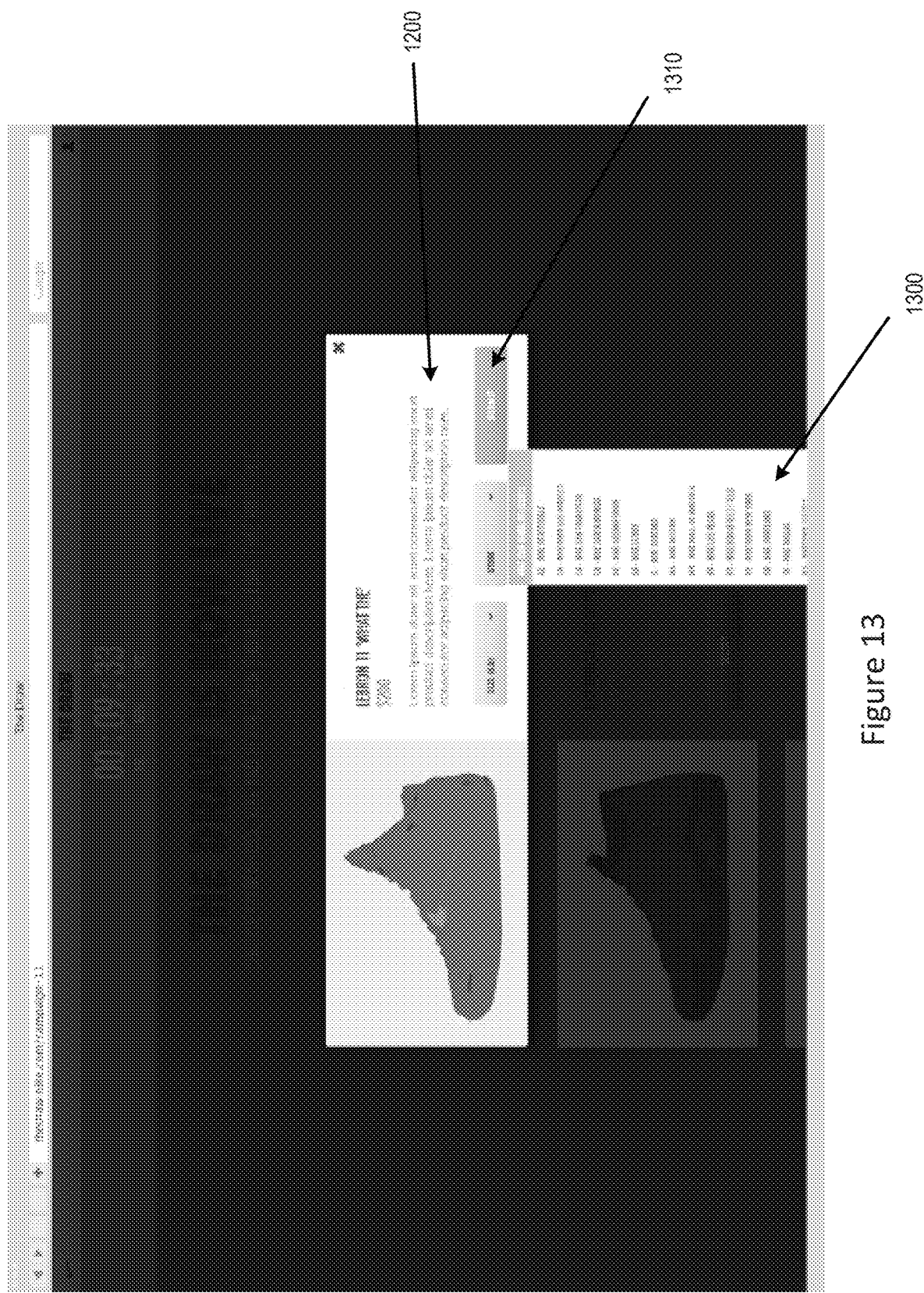

Next in step 314, the product reservation system may receive delivery information and/or preferences for the exclusive product, event, and selected by the user during step 312. As illustrated in FIG. 13 and as described in greater detail below, in some aspects of the disclosure herein, the product reservation system may provide users with a list of retail stores where the user may purchase and/or pick-up the exclusive product selected by the user in the event that the user wins the drawing. As another example, the product reservation system may also provide the user with an option to deliver (e.g., mail, ship, etc.) the exclusive product to a particular mailing address. In this example, the product reservation system may prompt the user to enter the mailing address into a text box (or some other interface element) provided on the website or other interface.

At step 316, the product reservation system may determine whether the session timer initiated at the start of the drawing session has expired. If the session timer has expired, the method may proceed to step 324. If the session timer has not expired, the method may proceed to step 317, where the product reservation system may receive a reservation request from a user for the product selected during step 312. In some embodiments, the product reservation system may receive user input selection via a user interface indicating that a user has submitted a reservation requests for a particular product. In some aspects of the present disclosure, after a user has submitted a reservation request, the product reservation system may transmit a message to the user indicating that the request has been received.

At step 318, the product reservation system may determine whether the user desires to submit an additional reservation request(s) for other products, events, and/or services being offered during the current drawing session. During step 318, the product reservation system may prompt the user, via a display interface, to submit additional reservation requests, or alternatively, to end the product drawing session. If the product reservation system determines that the user desires to submit additional reservation requests, the method may proceed back to step 312. If the product reservation system determines that the user does not wish to submit additional reservation requests, the method may proceed to step 324. Similarly, in embodiments where only one product is being offered during the drawing session, the method may proceed to step 324.

At step 320, the product reservation system may transmit a notification to the user indicating that the product drawing session has expired. In some embodiments, the product reservation system may present a notification (or message) on a user interface indicating that the product drawing session has expired. In other embodiments, the product reservation system may broadcast a message to multiple users indicating that the product drawing session has expired. At step 322, the product reservation system may determine whether the user has submitted at least one reservation request during the drawing session. If the product reservation system determines that the user did not submit a reservation request during the drawing session, the process may end. If the product reservation system determines that the user submitted a reservation request during the drawing session, the method may proceed to step 324.

At step 324, the product reservation system may process the one or more reservation requests submitted during the drawing session. Step 324 may include comparing attributes and selection information included in reservation requests, such as colors, sizes, delivery preferences, to available inventory. As will be discussed in more detail below, the product reservation system may communicate with inventory databases, data storages, or other computing devices to exchange information (e.g., supply chain data), and to determine the availability of exclusive products, events, or services being offered to consumers via the product reservation system. For example, with respect to exclusive footwear products, the product reservation system may communicate with a supply chain management system, inventory database, and/or other data storage to exchange supply chain data and other information concerning the footwear products being offered to consumers via a drawing session.

In some aspects of the present disclosure, the product reservation system may be configured to dynamically update and/or adjust inventory information for specific products, utilizing exchanged supply chain data, as consumers are matched to available products (e.g., user reservation requests are accepted), and as those excusive products are subsequently purchased and/or delivered. By integrating the product reservation system with supply-chain management systems of the entity offering and/or distributing the exclusive product (or other third parties), the product reservation system may facilitate the simple and efficient communication of supply chain data between supply chain (or trade) partners, such as factories, wholesalers, retailers, transportation companies, and the consumer. Accordingly, the product reservation system may have integrated, real-time access to critical supply chain data, such as supply/inventory, demand, product order status, and delivery status, etc., thus streamlining the inefficiencies in managing the distribution and delivery of products offered via a drawing session, and providing consumers with real-time information regarding the availability of those products, as well as status updates concerning submitted (or processed) reservation requests.

During step 324, the product reservation system may determine which users (and/or reservation requests) will win the drawing and be given an opportunity to purchase the product. In some aspects of the disclosure herein, the product reservation system may determine the winner(s) of a drawing by randomly selecting various users that have submitted a reservation request. In other example embodiments, the product reservation system may rank the users that have submitted a reservation request (or alternatively, rank the reservation requests themselves) based on variety of factors. For example, the product reservation system may rank users based on the number of reservation request previously submitted by the user, the number of drawings previously won by the user, the number of instances in which a user failed to purchase a product after winning a drawing, and the like. As another example, the product reservation system may rank users based on athletic activity data stored in the user's online community account (e.g., Nike profile/account). For example, the product reservation system may rank users based on a level of athletic activity performed within a predetermined time period (e.g., 1 day, 1 week, 1 month, 1 year, etc.) prior to the drawing session. The product reservation system may rank users based on a number of personal athletic activity goals or milestones achieved by the user. The product reservation system may select the highest ranked user(s) as the winner(s) of the product drawing, and offer the winning user(s) an opportunity to purchase the selected product.

Additionally or alternatively, the product reservation system may rank users based on a point system. The product reservation system may track the number of points rewarded to and/or subtracted from a user as they participate in drawing sessions over time. A user may be awarded points for a variety of actions (or events), such as participating in a drawing session, registering a user account, failing to win a drawing, responding to a broadcast message, participating in athletic activities, and the like. As an example, users that fail to win drawings over time may accumulate a sufficient number of points to increase their overall ranking, and as such, also increase their chances of winning sub sequent drawings. Similarly, the user may lose points for a variety of reasons (or events), such as failing to purchase a product after winning a drawing, failing to participate in a threshold level athletic activity within a predetermined time period, wining a drawing, and the like. The product reservation system may weight the number of points awarded to and/or subtract from a user for each of the various events discussed above. There are a variety of other ways in which the product reservation system may rank users or their corresponding reservation requests based on information collected by the system without departing from the scope of the present disclosure.

In addition to determining the winners of the product drawing, the product reservation system may process reservation requests submitted by users and generate various types of notification messages. For example, the product reservation system may process a reservation request and determine that the requested product or requested size is not recognized or no longer available at the preferred store location, and the notification message may indicate the same to the consumer. The product reservation system may also determine whether the consumer already has a pending product reservation, and the notification message may indicate the system has already received a product reservation from the user for that product.

At step 326, the product reservation system may transmit the results of the drawing to one or more user. The product reservation system may process the results of the drawing and generate a personalized message to each user submitting a reservation requesting indicating whether they won or lost the drawing. The product reservation system may process the results of the drawing and generate various types of notification messages. For example, the product reservation system may process the drawing results and transmit a request for payment message (or notification) to the one or more winners of the drawing. As another example, the product reservation system may process the drawing results and send a notification to the losers of the drawing querying whether they wish to be notified if additional products become available, for example, if a winner of the drawing decides not to purchase the exclusive product or does not purchase the product within a predetermined time period.

It will be appreciated that alternative types of media channels may be employed to broadcast messages by the product reservation system. Furthermore, combinations of various types of media channels may be employed to broadcast the availability of exclusive product offerings and receive reservation requests. For example, one type of media channel (e.g., Twitter) may be employed to broadcast the announcement of the availability of an exclusive product, event or service, and a different type of media channel (e.g., mobile device) may be utilized by a user to provide a response including the reservation request.

Alternative embodiments may use push notification features. For example, Android and iOS mobile devices include push notification features that may be used to implement aspects of the disclosure. A consumer may download an application and preregister. As part of the preregistration process consumers may be registered to participate in product launches exclusive to that application. By pre-registering consumers may offer up additional bits of information (shoe/apparel sizes, interests, set up of express checkout, etc.) and that information may be used to target product launches to particular consumers (e.g., as part of a loyalty program), and as the user may subsequently receive push notifications indicating the launch of exclusive products and the corresponding product drawing date/time. Push notifications may also be used to send consumers targeted messages that match consumer interests, and may only require an 'acknowledgement' of push notifications to submit a reservation request for that product.

Those skilled in the art will appreciate that aspects of the disclosure are not limited to use with products. In other embodiments the methods and systems described herein may be used in connection with services or products that have limited availability. For example, the product reservation system described herein may host, via a website (or other interface), one or more drawing sessions that offers tickets to sporting events.

The product reservation system may also be employed with respect to products for which availability is not limited, but for which a reservation may be desirable, e.g., products having a high-demand with the potential for significant wait times to purchase. It should also be appreciated that "product" as used in this description refers to physical goods, services, and any other purchasable things. Some embodiments may also include providing preferred consumers or others with messages announcing the availability of exclusive products and the occurrence of product drawing sessions before a general broadcast to other consumers.

Figure 4:
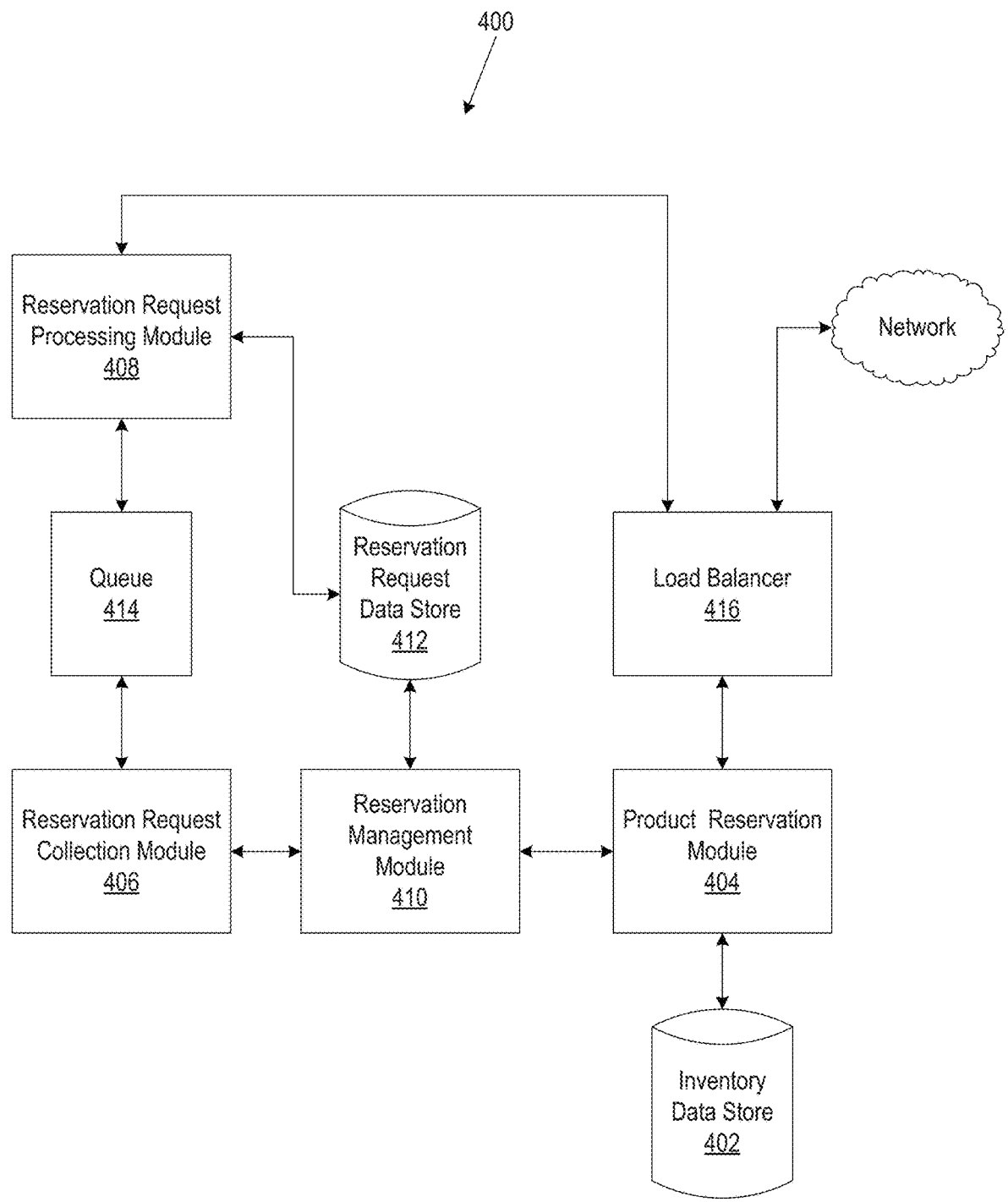
FIG. 4 illustrates an example product reservation system that may be used to implement aspects of the disclosure.

In other aspects of the disclosure herein, the product reservation system may also include an administrative platform, module, interface, dashboard, etc. for creating new product launch campaigns, composing and initiating the broadcast of the initial message indicating that a product drawing session will occur in the future, monitoring submitted reservation requests, and facilitating other administrative functions. As will be discussed in more detail below, an administrator may utilize the platform (or interface) to review supply chain data, historical reservation request data, and other FIG. 4 illustrates an example of a product reservation system 400 that may be implemented in accordance with aspects of the disclosure. The product reservation system 400 automates the product reservation process allowing consumers to reserve a right to purchase exclusive products and/or services via, e.g., a website interface. The product reservation system 400 may manage inventory at an inventory data store 402. The product reservation system 400 may be operatively connected (via one or more communication links) to an inventory database or supply chain management system of the entity offering exclusive products and/or services via product reservation system 400. The product reservation system 400 may be configured to retrieve information regarding current inventory levels (or other supply chain data), and store this information in inventory data store 402.

The product reservation system 400 may also communicate with consumers using a product reservation module 404, receive reservation requests via a reservation request collection module 406, and process reservation requests at a reservation request processing module 408. The product reservation system 400 also includes a reservation management module 410 that manages product reservation requests stored at a product reservation data store 412. The result is an elevated consumer experience and streamlined process that advantageously decreases overhead and margin for error in creating and running product reservation campaigns and drawing sessions.

The product reservation module 404 may be a load balanced application that serves as the user interface for the product reservation system 400. In other aspects of the disclosure herein, product reservation module 404 may be a load balanced application operatively in communication with web servers (not shown) hosting a product reservation website. An administrator may utilize the product reservation module 404 to update inventory for exclusive products being offered, create and configure product reservation campaigns & drawing sessions, and monitor active drawing sessions. The product reservation module 404 may also initiate the broadcast of the message announcing drawings and the availability of exclusive products, events, and/or services, e.g., by sending the initial broadcast message. The reservation request processing module 408 may be configured to dynamically (e.g., in real-time) update current levels of inventory for exclusive products and/or services offered during a drawing. Having the reservation request processing module 408 (or some other component of the product reservation system) dynamically update current levels of inventory for products and/or services may allow the system to more quickly and efficiently notify users concerning the status of a pending reservation request. Additionally, as will be discussed in more detail below, the product reservation system may notify users if additional inventory for an exclusive product becomes available (e.g., another user decides not to purchase the exclusive product).

Once a drawing session has begun, the reservation management module 410 may monitor the drawing session, e.g., by tracking and monitoring reservation requests submitted by various users. The reservation management module 410 may be a lightweight application that tracks the reservation request collection module 406. The reservation management module 410 may also serve as the interface to the reservation data store 412. The reservation request collection module 406 may connect to or communicate with the one or more web servers hosting the product drawing website to collect the reservation requests submitted by users via the website. The reservation request collection module 406 may be configured to track and store the number of reservation requests submitted by a user over time. The reservation request collection module 406 may transmit such information to the entity offering the exclusive product for subsequent use, such as when targeting future broadcast messages to particular users. The product reservation system 400 may include multiple reservation request collection modules 406. The reservation request collection module 406 may perform the initial processing of the reservation requests and route the reservation requests to be processed. The product reservation system 400 may maintain a queue 414 of submitted reservation requests waiting to be processed by a reservation request processing module 408.

The reservation request processing module 408 may include the business logic used to process the reservation requests as described above. The product reservation system 400 may include multiple reservation request processing modules 408. The reservation request processing module 408 may determine if a submitted reservation request matches any products that are currently available (or in-stock) at retail stores. If the reservation request processing module 408 recognizes a product and determines the product is available, it sends a request back to the product reservation module 404 to finalize and issue a message or notification indicating that the user has won the drawing. The product reservation module may perform some final checks to before issuing the notification, e.g., a check to ensure the product reservations are not overbooked.

The product reservation system 400 may sustain both the possibility for outages (availability) and the occasional spikes in traffic (scalability) to the product drawing website and the number of reservation requests submitted by users via the website. The system 400 may be configured to be modular and highly decoupled. Resource intensive modules may be replicated to provide extra resources in an ad hoc fashion to respond to traffic patterns. Additionally, the use of a reservation request queue 414 advantageously avoids any blocking of connections. A load balancer 416 may be employed to facilitate collection and processing of submitted reservation requests. In some embodiments, a caching system may also be employed to help to ensure that the product reservation system 400 can respond to reservation requests quickly.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments.

FIGS. 5-15 illustrate exemplary graphical user interface screens for presenting information to users and receiving information from users. As discussed above, after selecting a link included within a broadcast message, a consumer may be directed to website, (e.g., a website of the entity offering the product, event, or service), in order to participate in the drawing session and submit a reservation request. FIGS. 5-15 show a series of graphical user interface screens that provide consumers with the opportunity to reserve the right to purchase exclusive products by participating in a drawing. The example shown relates to footwear products. Of course, the process may also be used with other products such as clothing, athletic equipment, consumer electronic devices and any other product that may have a limited supply.

Additionally or alternatively, the process may also be used with events and other customer experiences, such as meeting professional athletes, tickets to athletic events, and the like.

Figure 5:
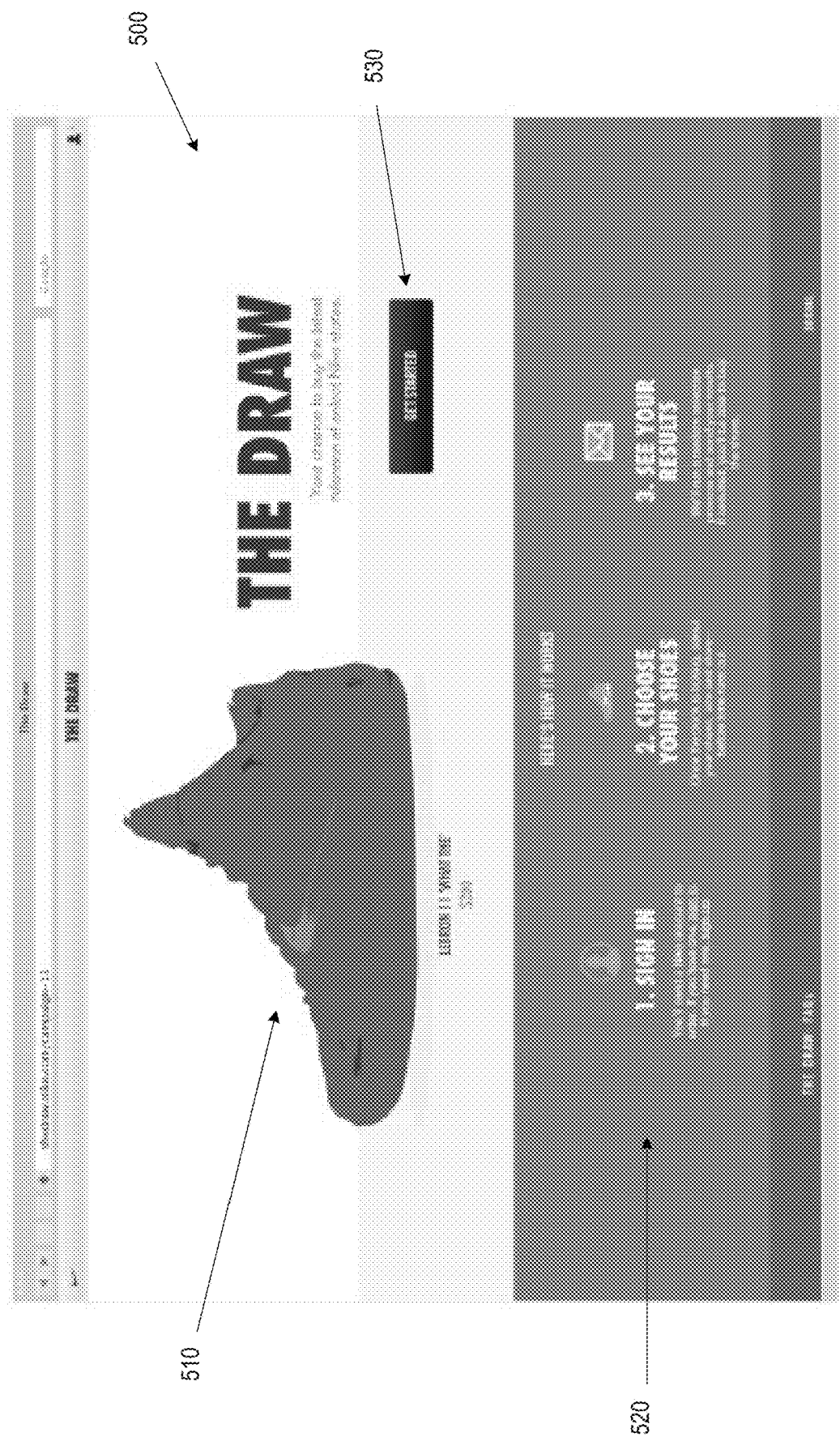
FIG. 5 illustrates an example user interface screen for a product reservation system in accordance with aspects of the disclosure.

FIG. 5 illustrates an example user interface screen 500 (as may be generated on a computing device) in which a user is involved in an on-line drawing to reserve a right to purchase an exclusive product. The website hosting the drawing session may display various products being offered to consumers in a first portion of the interface display 500, such as product display area 510. The product(s) shown in display area 510 may correspond to the exclusive product(s) being offered and/or advertised in a broadcast message to consumers. As shown in FIG. 5, a second portion of the interface display 500 may provide consumers visiting the website with instructions for participating in the drawing for the exclusive product and submitting a reservation request. For example, display area 520 illustrates that in order for a user to participate in a drawing for the exclusive product, the consumer must sign into and/or register for a user account, choose the product that they wish to reserve, and then wait to determine the results of the drawing. A consumer may advance to the next steps in the product reservation process by selecting the "Get Started" interface element (i.e., element 530).

Figure 6:
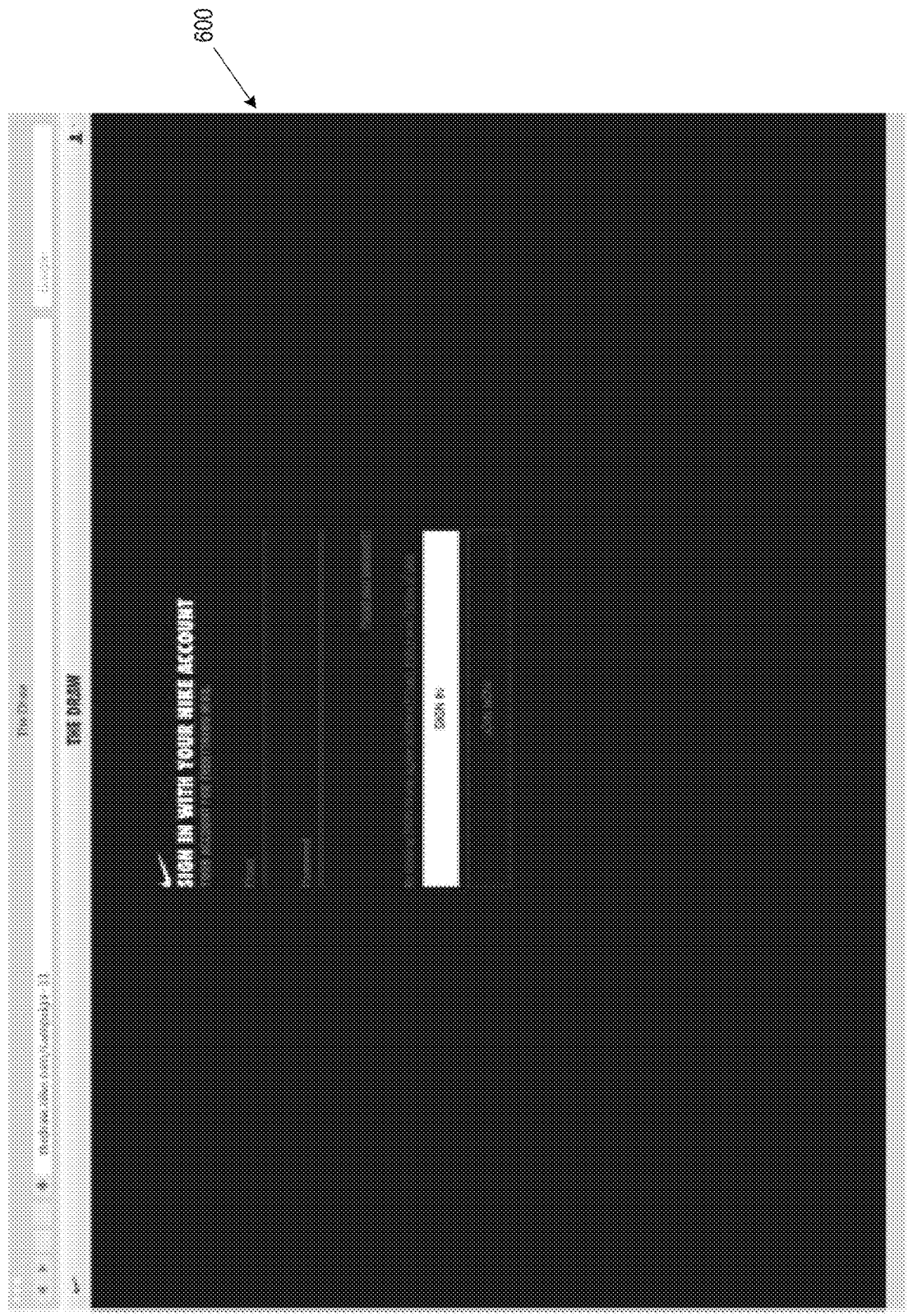
FIG. 6 illustrates an example user registration interface screen in accordance with aspects of the disclosure.

FIG. 6 illustrates an example of a user interface response that might take places as a result of a consumer selecting the Get Started interface element as described in conjunction with FIG. 5. In this illustrated example, a login interface for the product reservation website is presented to the user. Login interface 600 may include an overlay screen portion or text box(es) that request information from the user in order to launch the drawing session. For example, as illustrated in FIG. 4, text boxes may be displayed in a portion of login interface 600 that request entry of the user's email address and password. The request(s) for information may be provided to the user in any desired manner or format without departing from the present disclosure, such as via text input boxes, drop down listings, etc.

In some embodiments, one or more text boxes displayed in login interface 600 may be pre-populated with the requested user information. For example, if a user has previously created a user account with the entity offering the exclusive product (e.g., a Nike+ account), the website may retrieve the requested user information from a cookie (or other data storage), and display the user information in the one or more text boxes when the login interface is initially displayed to the user. Once all necessary or desired information is input by the user, the drawing session may be launched by user input at the "Sign In" icon (or in any other desired manner). Optionally, if desired, the drawing session can be launched directly from the interface screen of FIG. 5, without the need for input of this type of additional information, without departing from the present disclosure. This may be done, for example, if user information for the consumer (e.g., email, password, etc.) and ID information for the computer starting the drawing session has already been stored (e.g., in a cookie), and is available from a previous drawing session, etc.

Figure 7:
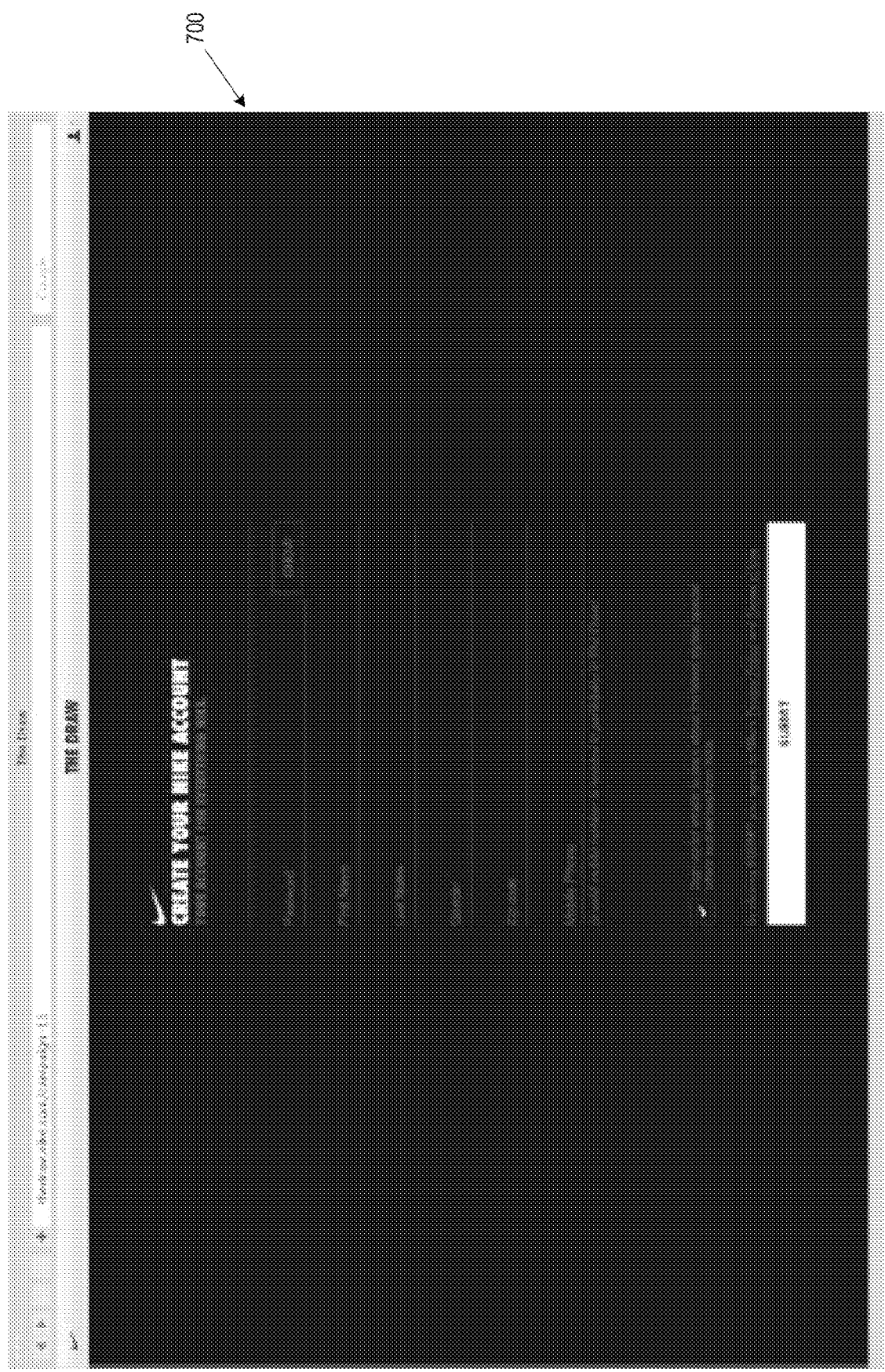
FIGS. 7-9 illustrate example user registration interface screens in accordance with aspects of the disclosure.

If a consumer does not have a user account, the consumer may register for a new user account by selecting the "Join Now" icon. FIG. 7 illustrates an example registration interface 700 that may be presented as a result of a user selecting the Join Now icon as described in conjunction with FIG. 6. In this illustrated example, registration interface 600 may request information from the user in order to generate a user account and launch the drawing session. For example, the registration may include text boxes that request entry of the user's name, email, a user ID, password, gender, zip code, mobile phone number, and other desired information. As another example, the registration may include text boxes that request entry of payment information (e.g., credit card information, bank account number, online payment service credentials, etc.) from the user. In this example, the product reservation may store this information for subsequent use if the user is successful in reserving the right to purchase an exclusive product (e.g., the user is a winner in the product drawing). In some aspects of the disclosure, the user may have the option to automatically credit any purchases made during the drawing session to a preferred credit card (or any other method of payment) in the event the user is selected as a winner of the drawing.

Figure 8:
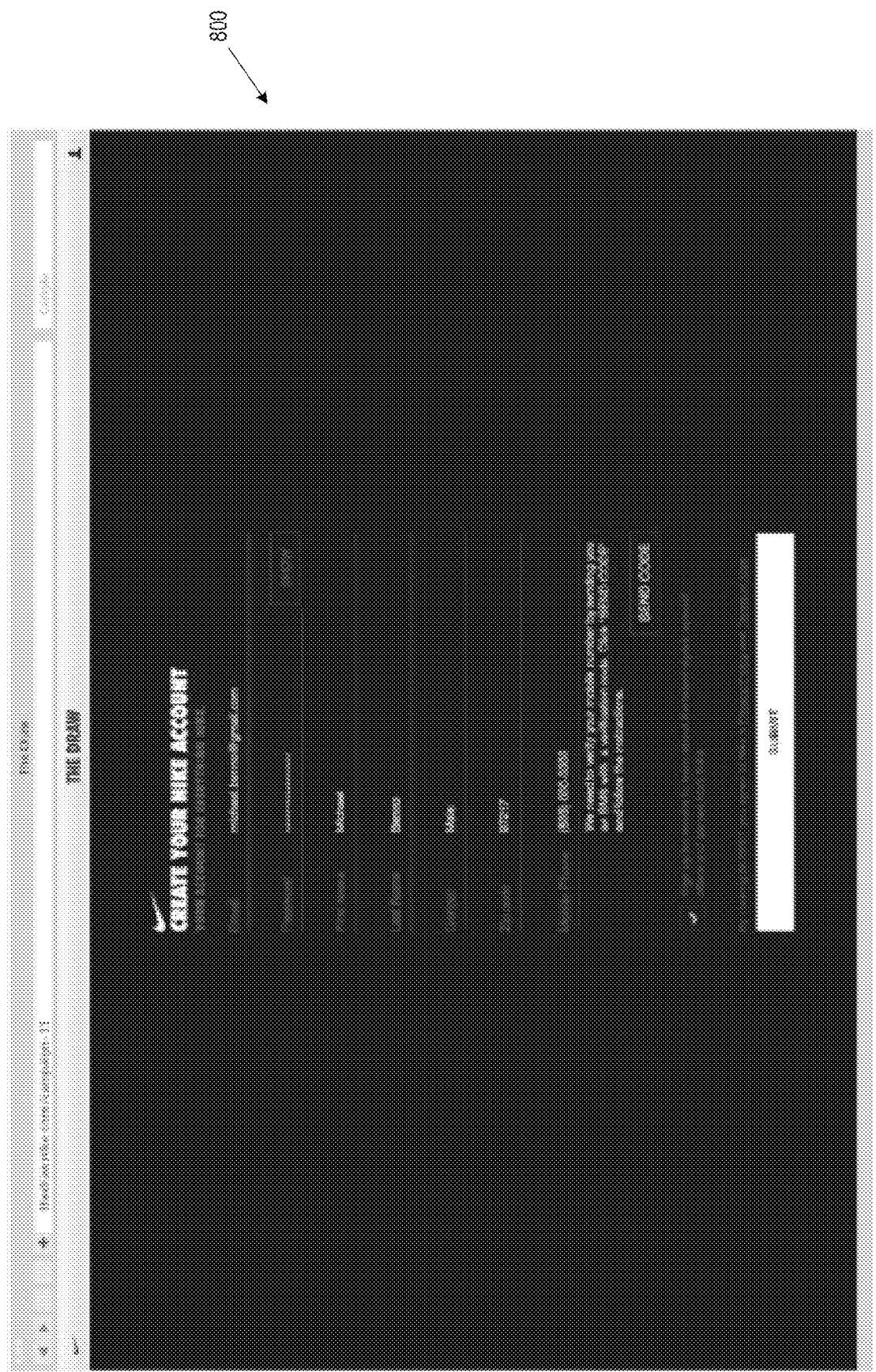
Figure 9:
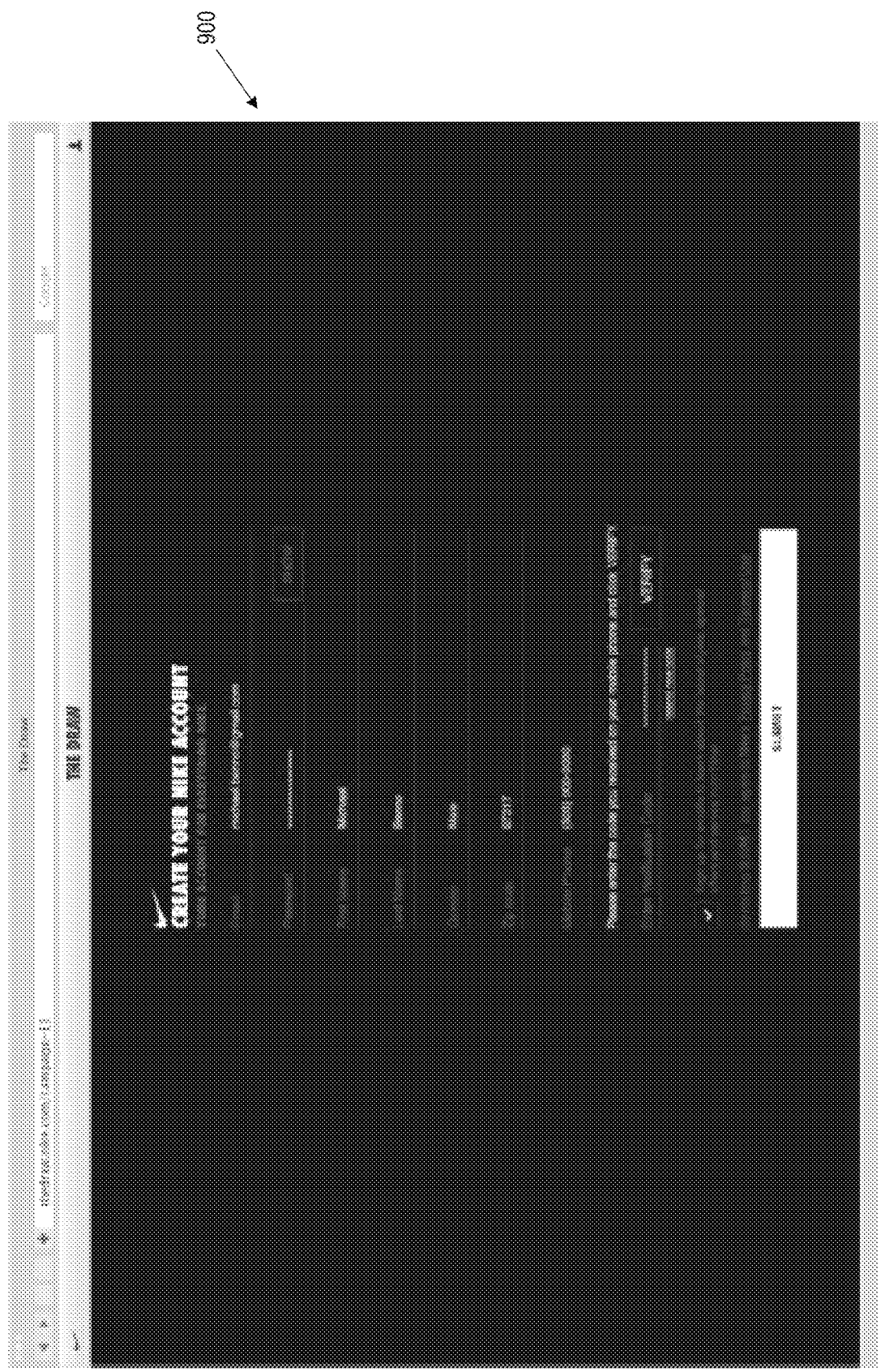

In some aspects of the present disclosure, the product reservation system may require a user to verify information provided in the registration interface. The product reservation system may transmit a verification email, text, or other message to the user containing a unique code or message. For example, as illustrated in FIG. 8, upon selecting the "Send Code" icon, the product reservation system may transmit a code to the mobile device associated with the mobile phone number provided by the consumer. As illustrated in FIG. 9, a user may have to re-enter the transmitted code in the registration interface in order to verify their account information. Various other methods of verifying account information provided by a user may be performed by the product reservation system without departing from the scope of the disclosure herein.

FIG. 10A illustrates an example user interface that may be displayed to a consumer as a result of initiating a product drawing session as described above. In this illustrated example, interface display 1000 may be presented to a user that attempts to initiate the product drawing session prior to the predetermined start time of the drawing. As illustrated in FIG. 10A, the drawing for the exclusive product shown in display area 1010 does not begin until 7 pm on a predetermined date (e.g., September $10^{th}$). Accordingly, the product reservation platform may not permit users to submit reservation requests until after a predetermined date and time. As further illustrated in FIG. 10A, a consumer may obtain additional information about the exclusive product shown in display 1010 by selecting the "Learn More" icon (i.e., interface element 1020). Additionally, a portion of interface display 1000 may display a product name, a cost, or other information associated with the exclusive product being displayed in display area 1010.

As illustrated by element 1040, a portion of interface display 1000 may provide the user with access to additional information regarding the product drawing session. For example, after interface element 1040 is selected by a user, an overlay portion screen may be presented to the user providing additional information, such as answers to frequently asked questions, concerning the product drawing session, submission of reservation requests, and the like. Optionally, if desired, a new interface display may be displayed to the user providing additional information regarding the product drawing session. Additionally, interface display 1000 may include an interface element (e.g., element 1050) that provides users with information regarding upcoming launches and releases of exclusive products. For example, the user may be directed to an interface that includes a calendar display the days on which exclusive products will be released for a given month.

In some aspects of the present disclosure, multiple exclusive products may be offered to a user during a product drawing session. For example, as illustrated in FIG. 10B, a user may submit a reservation request for each of the three exclusive products shown in interface display 1070. Product and cost information for each exclusive product may be displayed to the user on interface display 1070 as described above in conjunction with FIG. 10A.

In some aspects of the disclosure herein, a user may "post" to a social networking website a notification that they are participating in the product drawing session. Many social networking websites have a user profile webpage that allows the user to post personal items or status updates for viewing by others. Visitors to the website hosting the product drawing session may wish to notify others that they are participating in a product drawing session, have successfully reserved an exclusive product, and the like. Such social networking websites may be maintained by the same entity that maintains the product drawing website, such as the manufacture of the exclusive products being offered. Additionally or alternatively such social networking websites may be maintained by a third party, such as Facebook®, Twitter®, MySpace®, and the like.

For example, as depicted by display area 1060 in FIG. 10A, interface display 1000 may display icons associated with various social networking websites or online communities. Users may have the option to accomplish a "post" by clicking on one of the icons presented in display area 1060. In some aspects of the disclosure herein, a user may integrate (or affiliate) one or more social networking or online community accounts with a user profile associated with the product reservation system. In some arrangements, the user may receive communications relating to the launch of exclusive products and/or the opportunity to reserve the right to purchase such products.

FIG. 11 illustrates an example user interface that may be displayed to a user as a result of initiating a product drawing session as described above. In this illustrated example, interface display 1100 may be presented to a user that attempts to initiate the product drawing session within the predetermined time established by the product reservation system for submitting one or more reservation requests. As illustrated in FIG. 11, a portion of interface display 1100 (e.g., display area 1110) may include a session timer (or clock) indicating an amount of time a user has to complete the product drawing session and submit reservation requests. For example, the product reservation system may provide the user with 3 minutes, 5 minutes, or any other suitable amount of time to complete the product drawing session. In other aspects of this disclosure, the session timer (or clock) may indicate an amount of time remaining prior to the end of the product drawing session. For example, as illustrated in FIG. 11, display area 1110 may indicate that the product drawing session will end in 10 minutes, and as such, the product reservation system may no longer accept reservation requests upon expiration of the session timer.

In some embodiments, a portion of interface display 1100 (e.g., display area 1120) may display an image of and related product information for (e.g., product name, cost, etc.) for the exclusive product being offered during the product drawing session. Additionally or alternatively, as illustrated by element 1130, interface display 1100 may also display images and related product and cost information for the one or more other exclusive products being offered during the current product drawing session. As illustrated in FIG. 11, a user may select icon 1140 in order to continue the product drawing session and submit a reservation request for the exclusive product shown in display area 1120.

Figure 12:
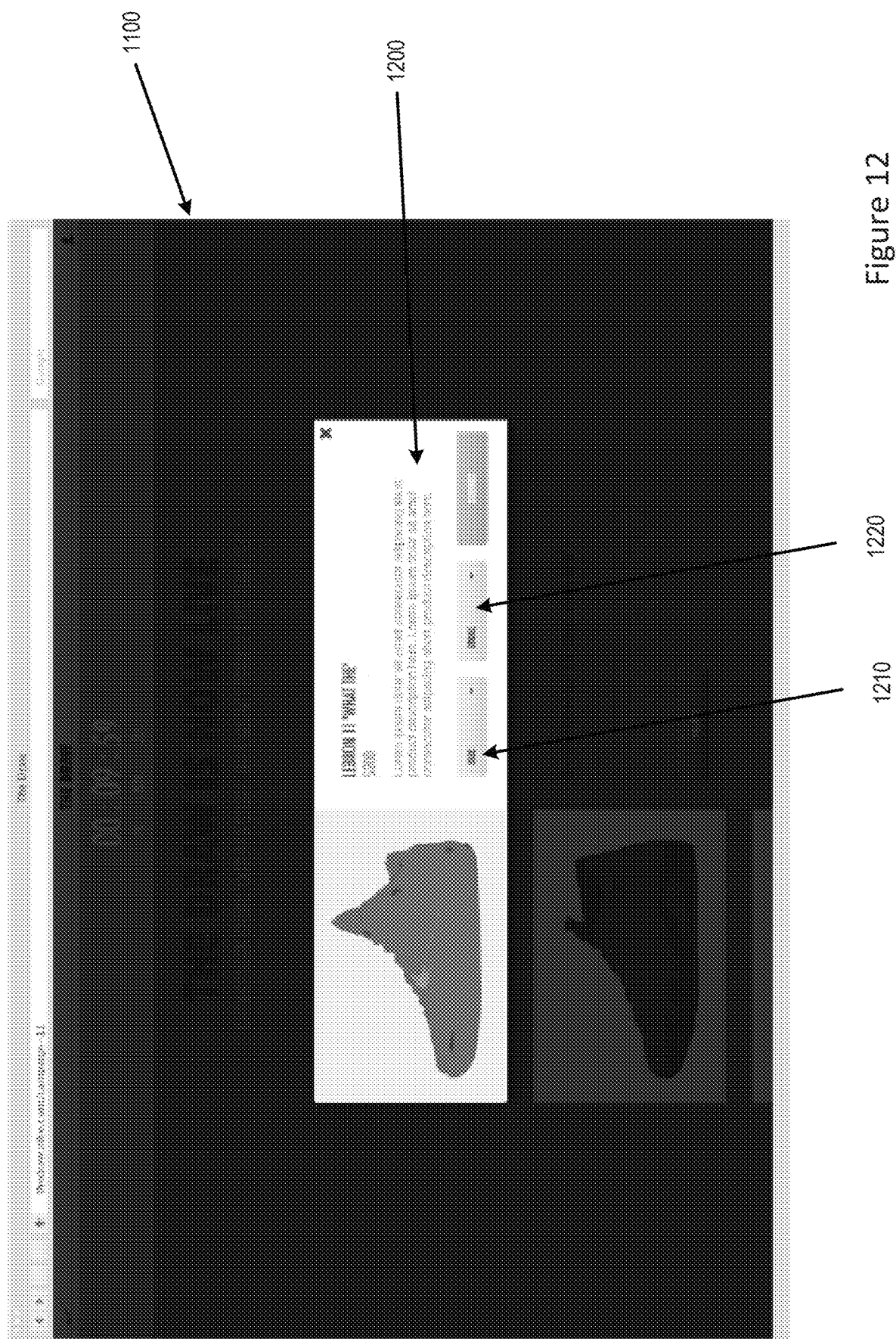
FIGS. 12-13 illustrate example overlays for a product reservation user interface in accordance with aspects of the disclosure.

FIG. 12 illustrates an example user interface that may be displayed to a user as a result of initiating a product drawing session as described above with reference to FIG. 11. In this illustrated example an overlay screen portion 1200 may be provided on interface display 1100. In some aspects of the present disclosure, when overlay screen portion 1200 is presented, interface display 1100 may be partially or substantially obscured in order to visually emphasize overlay screen portion 1200. For example, as illustrated in FIG. 12, interface display 1100 is partially obscured (e.g., "greyed-out") such that overlay screen portion 1200 is visually emphasized to the user. As illustrated in FIG. 12, overlay screen portion 1200 may include an image of the exclusive product that a user desires to reserve. Additionally, overlay screen portion 1200 may include one or more icons (or interface elements) that may request additional information regarding the exclusive product the user desires to reserve. For example, overlay screen portion 1200 may include a "Size" icon (i.e., icon 1210) that, upon selection, displays a list of available product sizes for the footwear product selected by the user.

As discussed above, the product reservation system may communicate with a supply-chain management system, inventory database, data storage (e.g., inventory data store 402) and/or some other computing device(s) to exchange supply chain information concerning the various products, events, or service being made available via a drawing session. In some aspects of the present disclosure, the product reservation system may receive real-time supply-chain data, inventory information, and/or updates concerning the availability of exclusive products. For example, when receiving reservation requests from consumers during a drawing session, the product reservation system may retrieve and process supply chain data to determine whether products and/or product sizes are available for purchase at particular retail stores or locations. Providing the user with real-time data regarding the availability of exclusive products may allow the user to make more informed decisions when making product decisions and selecting delivery preferences. Referring back to FIG. 12, the product reservation system may dynamically update the list of product sizes displayed to the user in accordance with a current inventory for that product. The product reservation system may quickly and efficiently accepted match reservation requests with available inventory for exclusive products at particular retail locations, and as such, reduce the amount of time to process reservation requests and provide instant results of product drawings to participating users.

In some aspects of the present disclosure, the product reservation system may be configured to transmit information concerning reservations and purchases made by consumers during and/or after a drawing session. For example, as reservation requests for a particular footwear product are accepted and processed, the product reservation system may transmit product information, delivery information, and other supply chain data to a supply chain management system or other data storage for further processing. The product reservation system may also be configured to exchange and/or update supply chain data as winners of a particular drawing session purchase the reserved products. For example, when a user purchases (or doesn't purchase) a product after winning a drawing, the product reservation system may update and/or transmit to other management systems supply chain data in accordance with the purchase (or non-purchase) of the product.

Additionally, the product reservation system may exchange supply chain data with retail store locations to ensure adequate inventory levels of particular products as user complete the purchases of products after winning a drawing session. The product reservation system may utilize information collected during a drawing session and supply chain data to assess product demand and determine the proper allocation and distribution of products to retail stores in real-time. For example, the product reservation system may extract product and delivery preference information for reservation requests submitted by winners of a drawing session, and communicate such information to a supply-chain management system or inventory database to update inventory levels and other supply chain data. In other aspects of the present invention, an administrator of the product reservation system may selectively manage which products are made available via a drawing session based on supply chain data, such as the supply/demand information for available products. For example, the product reservation system may retrieve from memory historical reservation request data to determine demand for a previously offered product. This demand information may be utilized by the administrator, along with other supply chain data to determine whether to make a product available via a drawing session.

Additionally or alternatively, historical reservation request data, supply chain data, and other information collected and/or processed by the product reservation system may be utilized to determine the optimal retail locations where products should be made available. For example, the product reservation system may analyze historical reservation request data to determine which retail stores received the most requests for a particular product, and may adjust inventory levels for that product at particular retail stores based on this information (e.g., increase the product supply at retail stores having the highest demand). As another example, the product reservation system may analyze historical reservation request data to determine which retail stores sold the least amount of a particular product via previous drawing sessions, and may adjust inventory levels for that product at particular retail stores based on this information (e.g., reduce the product supply at retail stores selling the least amount of products). Accordingly, the product reservation system may communicate with a supply chain management system to optimize the allocation of resources and product supply in advance of future drawing sessions.

Referring back to FIG. 12, in some example embodiments, overlay screen portion 1200 may include a "Store" icon (i.e., icon 1220) that permits a user to select from a list of stores offering the exclusive product. For example, as illustrated in FIG. 13, in response to receiving user input selection of the Store icon, overlay screen portion 1200 may display drop-down menu 1300, which provides a list of retail stores offering the exclusive product selected by the user. As discussed above with respect to Size icon 1210, the product reservation system may communicate with a database or some other data storage (e.g., inventory data store 402) to determine whether a particular retail store has the requested product and product size in inventory. Accordingly, the product reservation system may dynamically update the list of retail stores displayed to the user in accordance with a current inventory for that product. In some aspects of the present disclosure, menu 1300 may provide a list of retail stores from which the user may pick-up (or purchase) the exclusive product.

As illustrated in FIG. 13, in some aspects of the disclosure herein, the user may request delivery of the exclusive to a particular address, such as a home address. The user may be directed to a subsequent user interface to provide additional delivery information. In other embodiments, the user interface may retrieve delivery information from an account associated with the user, such as the account established by the user as discussed above with respect to FIG. 7. The request for information in the overlay screen portion may be provided to the user in any desired manner or format without departing from this invention, such as via drop-down listings, icons, buttons, etc. After the user has finished entering in the requested information, the user may select icon 1310 in overlay screen portion 1200 to submit a reservation request to the product reservation system for the exclusive product. In some aspects of the disclosure herein, icon 1310 may be presented in interface display 1100 or another interface display during the product drawing session.

Figure 14:
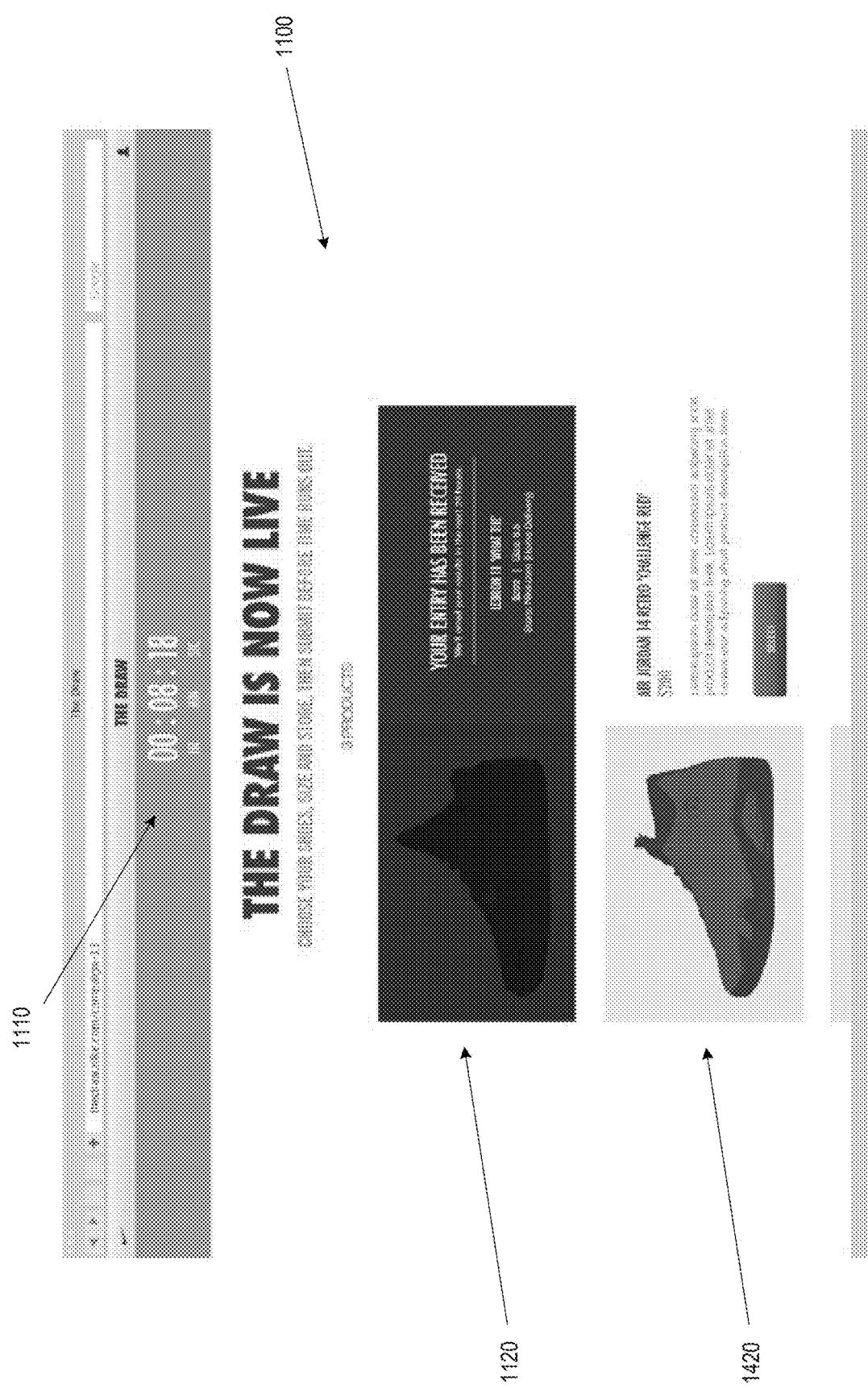
FIGS. 14-15 illustrate example product reservation user interface screens in accordance with aspects of the disclosure.

FIG. 14 illustrates an example user interface that may be displayed to a user as a result of the user submitting a reservation request as described above with reference to FIG. 13. For example, after submitting a reservation request for a first product, the user may be directed back to interface display 1100. In some embodiments, the user may be provided with a new interface display. The interface display, such as interface display 1100, may indicate that a user has submitted a reservation request for a particular product by visually modifying the display area associated with that product. For example, as illustrated in FIG. 14, display area 1120 has been modified to be partially obscured (e.g., semitransparent) to indicate that the reservation request submitted by the user for that particular product has been received by the product reservation system. Additionally or alternatively, display area 1120 may show a message to a user indicating when the user will be notified as to the results of the product drawing. For example, the message may indicate to the user that the results of the product drawing will be announced within a predetermined time period, e.g., 1 hour, 4 hours, etc. In some aspects of the disclosure herein, the results of the drawing may be displayed to the user immediately after the product drawing session closes. For example, upon expiration of the session timer, the user may be directed to a user interface that displays the results of the drawing. A user may be directed to the results interface regardless of whether the user has won or lost the product drawing. In some instances, the user interface may display a message to the user indicating that the user should wait momentarily as the drawing results are being processed.

After submitting a reservation request for a first product, the user may submit reservation requests for other available exclusive products during the product drawing session. For example, as illustrated in FIG. 14, the user may attempt to submit a reservation request for the exclusive product shown in display area 1420. In some embodiments, a user may be limited to a predetermined number of reservation requests (e.g., 1 request, 5 requests, etc.) over a predetermined time period. For example, each user may be provided with 5 reservation requests, which may be used over the course of 1 year. In some aspects of the present disclosure, a user may be awarded with additional reservation requests for a variety of reasons, such as registering a user account, failing to win a drawing, participating in a threshold amount of athletic activity, and the like. The number of reservation requests provided to each user may vary without departing from the scope of the present disclosure.

Figure 15:
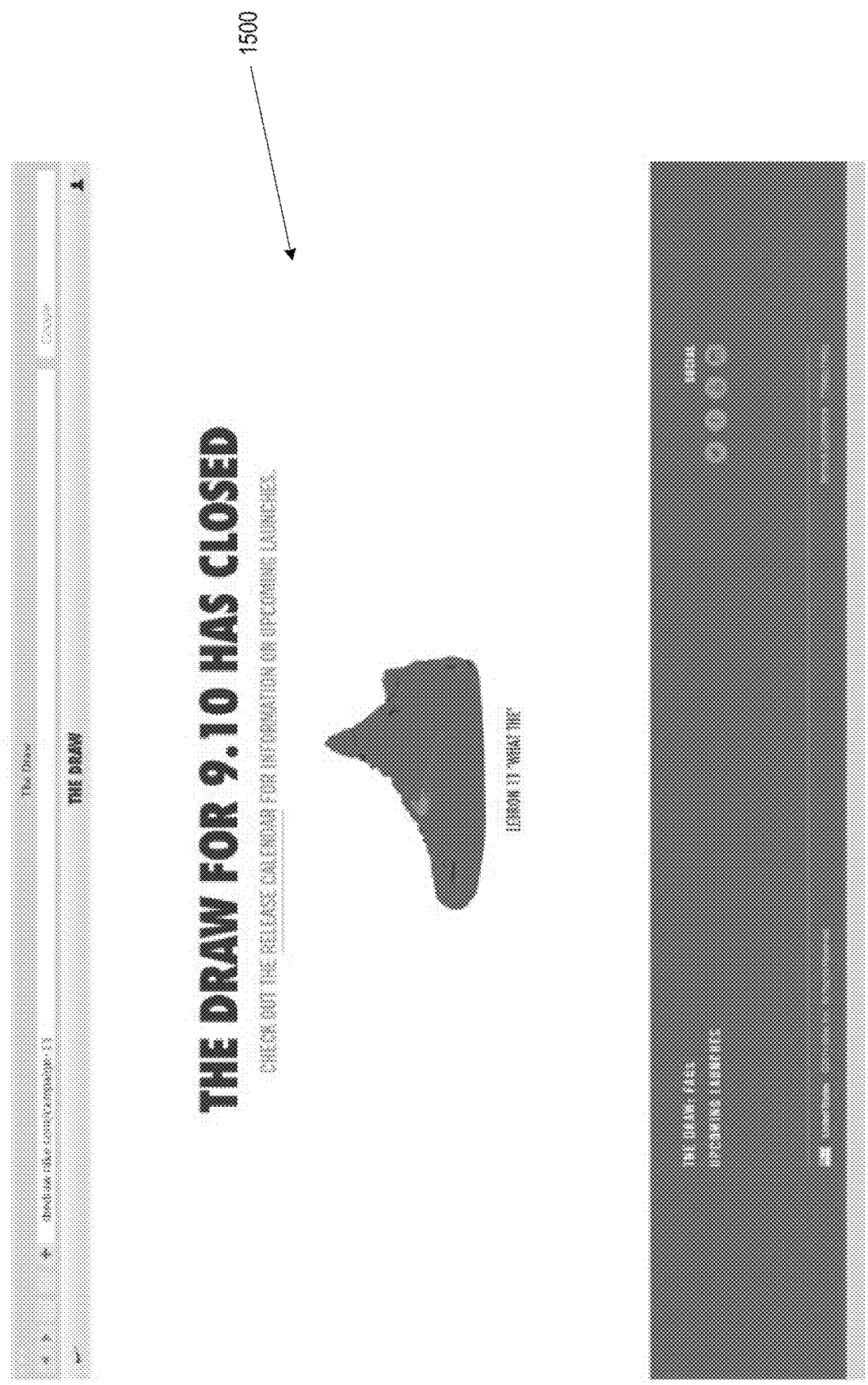

As noted above, a user may be required to submit reservation requests for other exclusive products prior to the expiration of the session timer in display area 1110. In some embodiments, upon expiration of the session timer displayed in display area 1120, the user may be directed to a user interface display indicating the product drawing session has ended. For example, as illustrated in FIG. 15, interface display 1500 provides a message to the user indicating that the product drawing session has closed.

Examples of Reservation Systems and Methods Embodied in a Mobile Device Application The product reservation system and methods described above may be implemented in various mobile computing devices, such as mobile telephones, smart phones, tablets, and other mobile devices. Some mobile computing devices may have access to the Internet through a Wi-Fi connection or through the cellular network via a gateway computer. Such mobile computing devices are capable of accessing websites, such as the product reservation and drawing session websites described above. Still other mobile computing devices are capable of running a software application on the mobile computing device so that the user may be able to directly interact with the product drawing session functionality. For example, entities that maintain websites on the Internet may create software applications for use on individual (or groups of) mobile computing devices, such as a mobile telephone or smartphone. Such a local software application provides the user with direct access to the functionality offered by an entity rather than accessing the website of the entity or a third-party.

As discussed above, a product reservation system may use a social networking service to broadcast messages to consumers concerning the opportunity to participate in product drawing session and submit reservation requests for exclusive products, events, and/or services. Social networking services, such as Twitter, allow users to create messages (i.e., Tweets) that are broadcasted to all followers of the Tweet source. Twitter also allows parties to exchange direct messages that are not shared with other followers, e.g., via direct message. As depicted by elements 1610 and 1630 in FIG. 16A, a user may receive one or messages, via a social networking service, concerning the launch of an exclusive product. The broadcast message may include a date and time at which a product drawing session will be held for the exclusive product being offered. Additionally, the broadcast message may include a hyperlink to the website where the user may participate in the product drawing session.

Figure 16B:
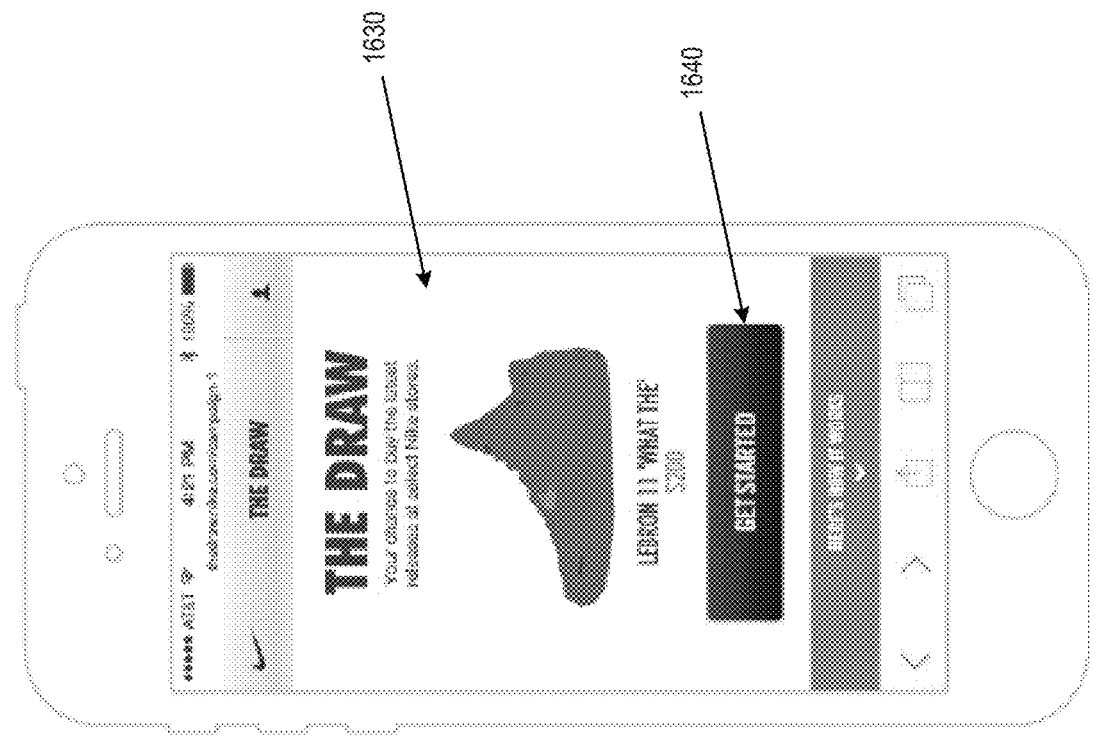
FIG. 16B illustrates an example user interface screen for a product reservation system in accordance with aspects of the disclosure.
Figure 16A:
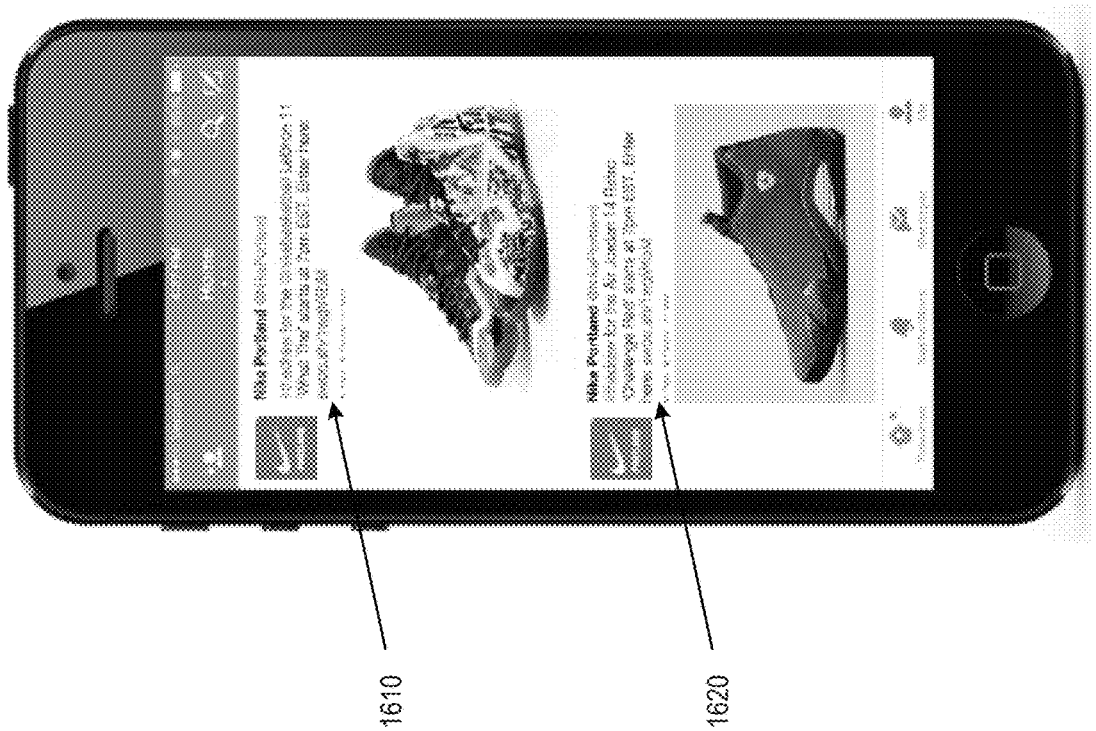
FIG. 16A illustrates an example social networking interface screen on a mobile device in accordance with aspects of the disclosure.
Figure 17A:
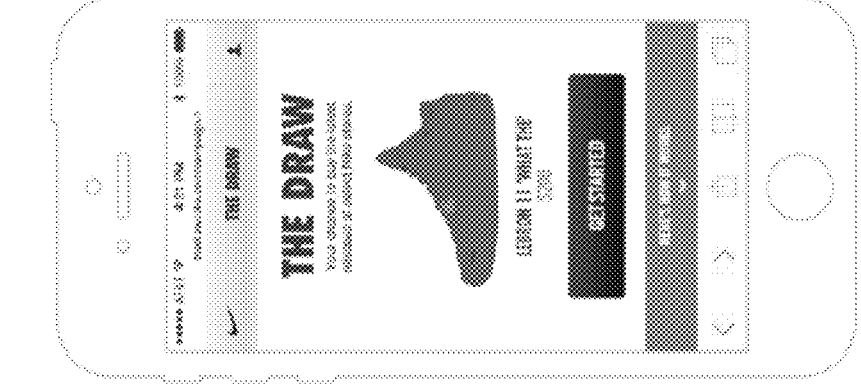
FIGS. 17A-D illustrate multiple perspectives of a user interface screen for a product reservation system in accordance with aspects of the disclosure.
Figure 17B:
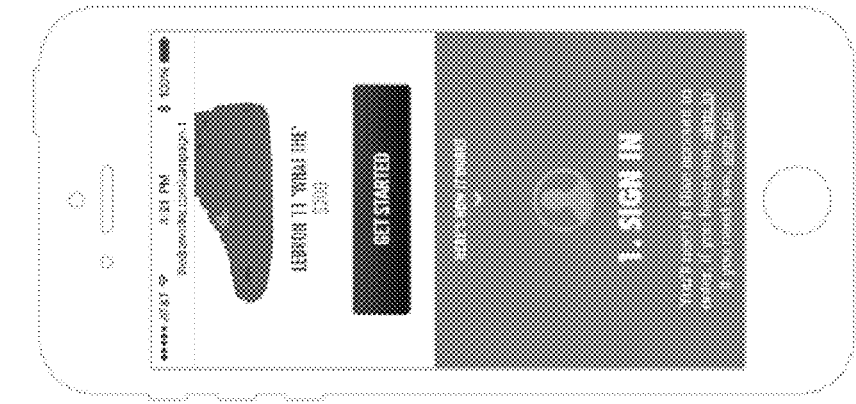
Figure 17C:
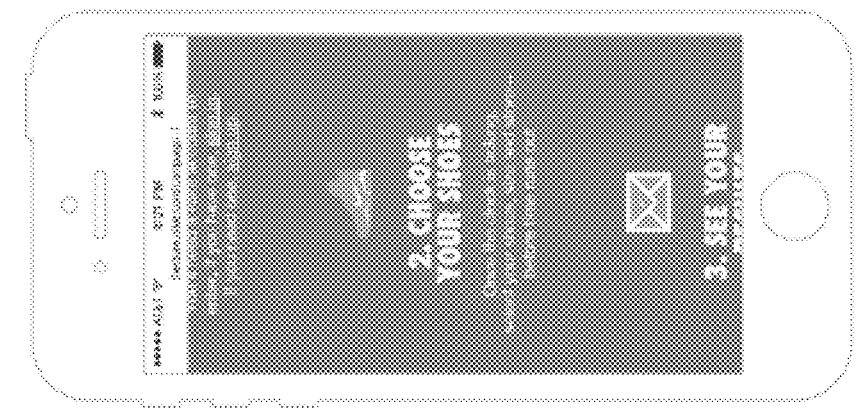
Figure 17D:

FIG. 16B illustrates an example webpage interface (e.g., interface display 1630), that may be presented to the user as a result of selecting the hyperlink contained in the broadcast message. The interface display may show images and product information of the various exclusive products being offered to consumers during the product drawing session. A consumer may advance to a next step in the product reservation process by selecting the "Get Started" interface element (i.e., element 1640).

As illustrated in FIGS. 17A-D, the user interface display may provide the user with additional information concerning the product drawing session and instructions for submitting a reservation request. A user may access this information by scrolling to see portions of the webpage interface not currently displayed on the mobile computing device. As will be appreciated, the mobile computing device may be equipped with a touch-sensitive display screen configured to recognize one or more physical gestures performed by the user as user input. For example, the mobile computing device may recognize an upward finger swipe performed by the user on the touch-sensitive display screen as user input corresponding to an upward scroll. Accordingly, upon recognizing this user gesture, the mobile computing device may scroll the interface being displayed on the mobile computing device display upward. As another example, the mobile computing device may recognize a single tap on the display screen as a user input selection. The user may also rotate, swipe, tap, or pinch the mobile computing device as a means of inputting data or selecting options and/or interface elements within the interface display. Any suitable method of inputting data or selecting options within the interface display may be implemented.

Figure 18C:
FIGS. 18A-C illustrate example user login and registration interface screens in accordance with aspects of the disclosure.
Figure 18B:
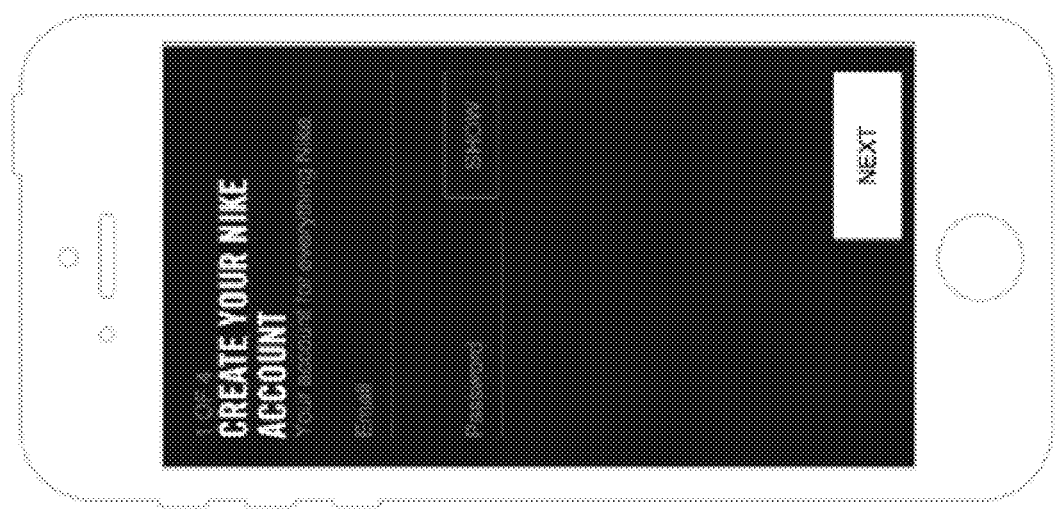
Figure 18A:
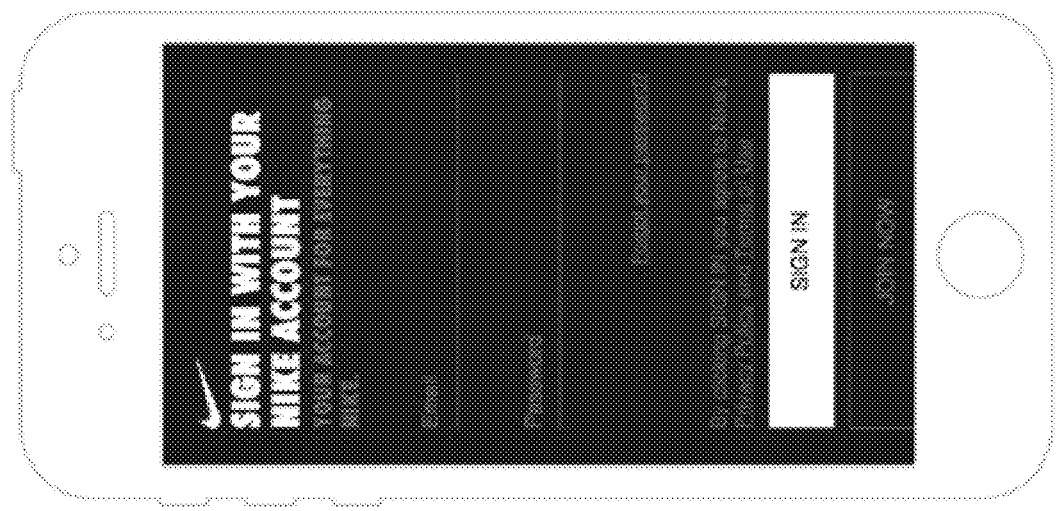
Figure 19C:
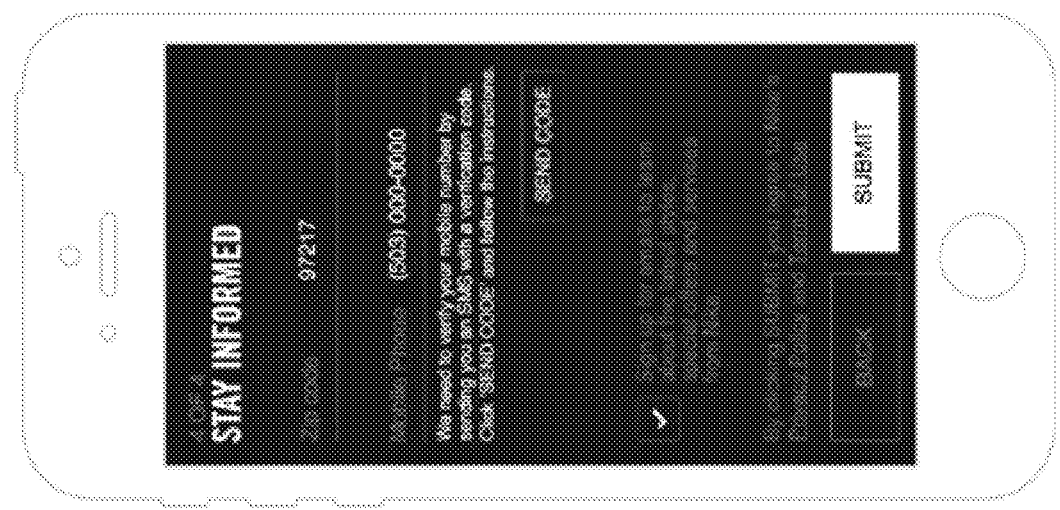
FIGS. 19A-E illustrate example user registration interface screens in accordance with aspects of the disclosure.
Figure 19B:
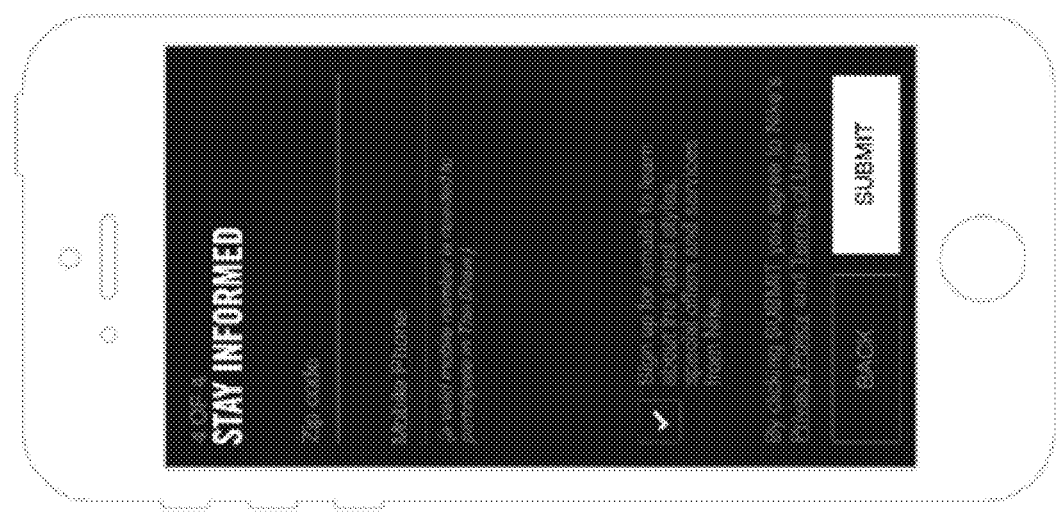
Figure 19A:
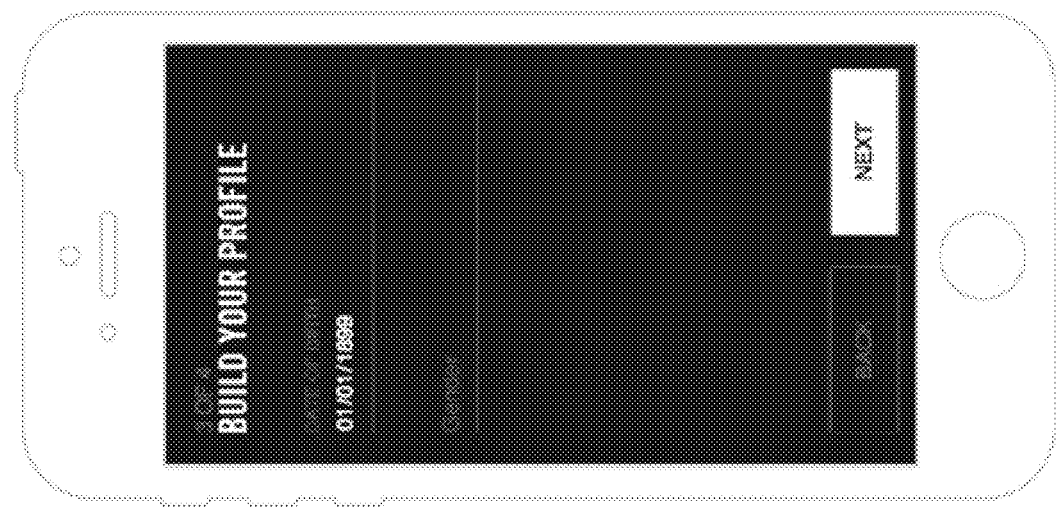

In order to access the functions available through the product drawing session, users may be required to have a user profile. Users without a profile may be required to register with the entity maintaining the product drawing website. For example, FIG. 18A illustrates a login screen interface that may appear when a user attempts to initiate a product drawing session. Users that already have existing user profiles may enter their identifying information, such as their email address and password, as shown in FIG. 18A. Users that do not have an existing profile may be required to register with the product reservation system. FIG. 18B illustrates an example registration interface display that may prompt a user for registration information such as email address and password. Additionally information may be requested from the user during the registration process. For example, as illustrated in FIGS. 19A-B, the registration interface may request the user to provide additional information, such as the user's date of birth, gender, zip code, and mobile telephone number. Any suitable information may be required for registration.

Figure 19E:
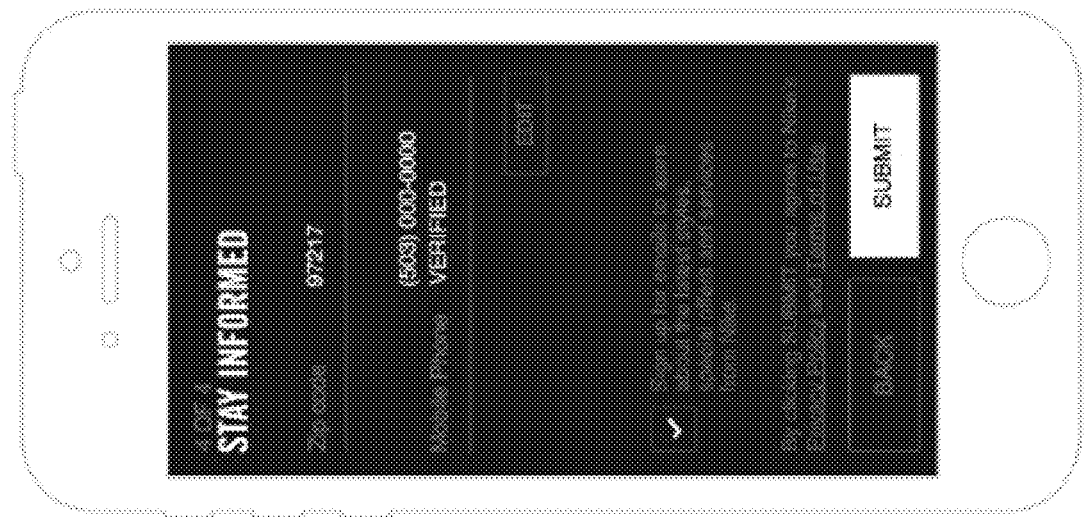
Figure 19D:

The product reservation system may transmit a verification email, text, or other message to the user containing a unique code or message so as to authenticate the information provided by the user. For example, as illustrated in FIG. 19C, upon selecting the "Send Code" icon, the product reservation system may transmit a code to the mobile device associated with the mobile phone number provided by the user. As illustrated in FIGS. 19D-E, the user may have to re-enter the transmitted code in the interface to verify their account information.

Figure 20C:
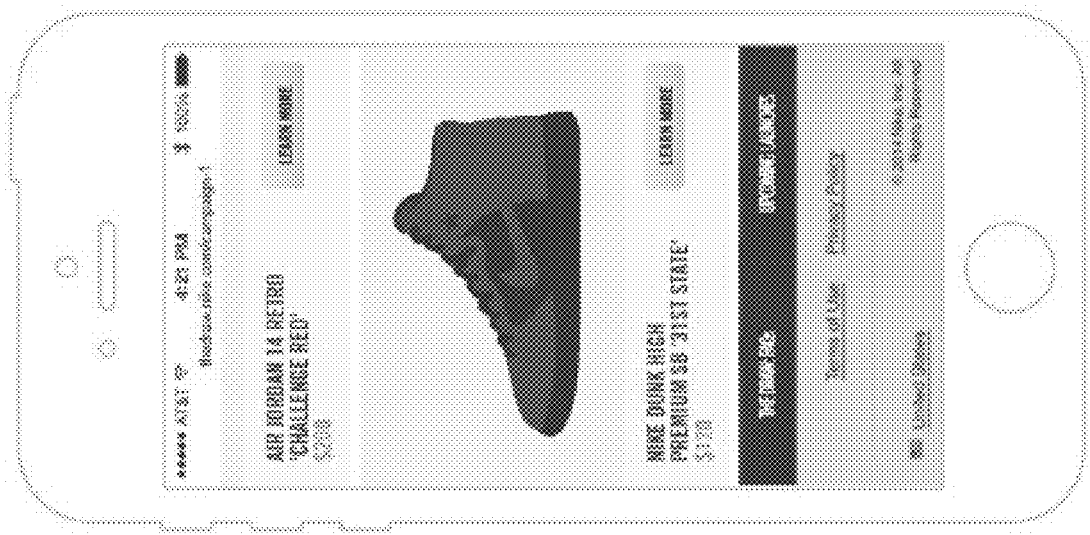
FIGS. 20A-C illustrate example user interface screens for a product reservation system in accordance with aspects of the disclosure.
Figure 20B:
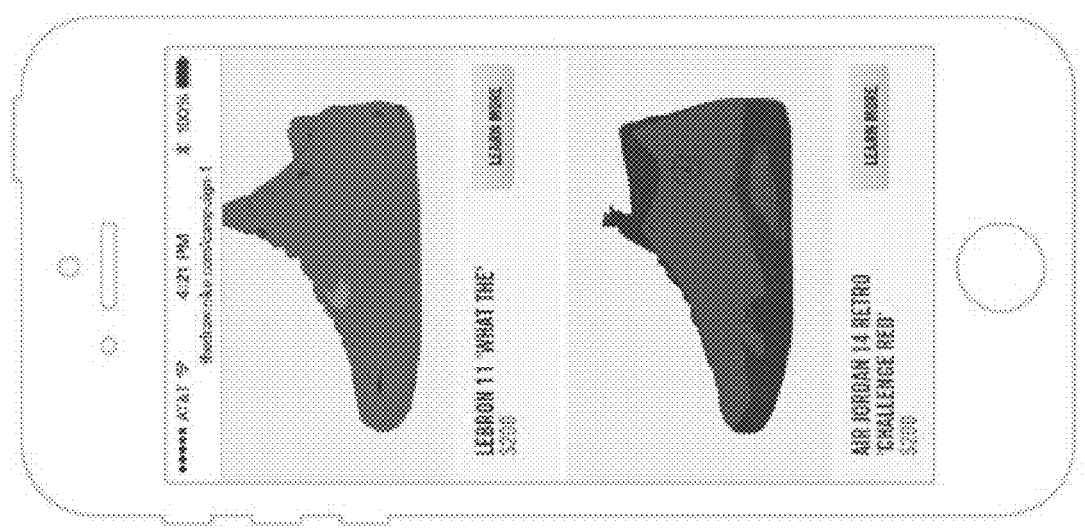
Figure 20A:

FIGS. 20A-C illustrate example user interface screens that may be displayed to a consumer as a result of initiating a product drawing session as described above. The predetermined date and time for the drawing may be displayed in a portion of the interface display. As further illustrated in FIGS. 20A-C, a consumer may view images of and obtain additional information for the exclusive products being made available during the upcoming drawing. For example, as shown in FIGS. 20A-C, the user may select the "Learn More" icon to obtain additional information regarding a product. The user may scroll through the interface to view additional products being offered during the product drawing session.

Figure 21B:
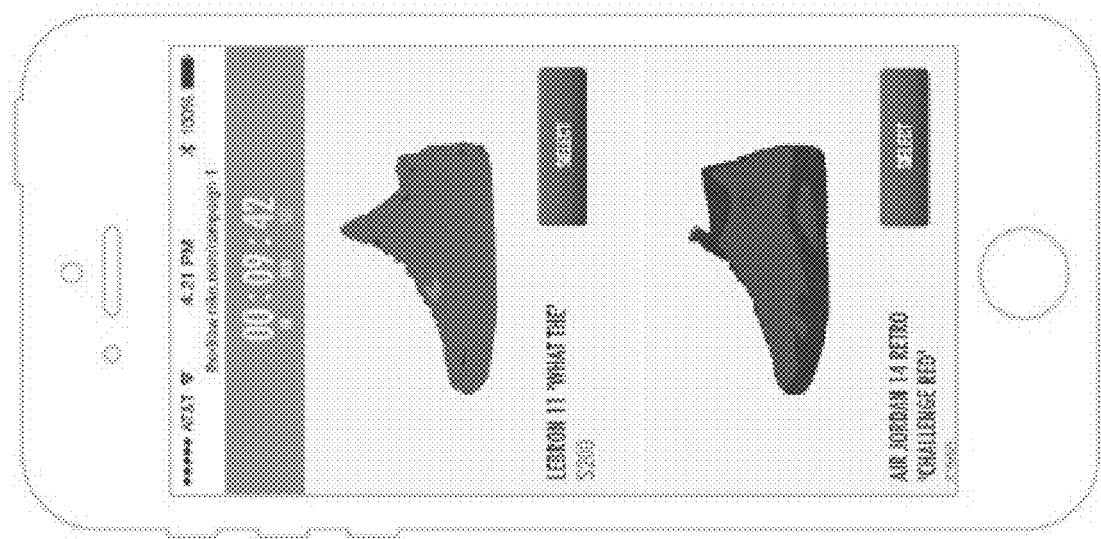
FIGS. 21A-B illustrate example user interface screens for a product reservation system in accordance with aspects of the disclosure.
Figure 21A:
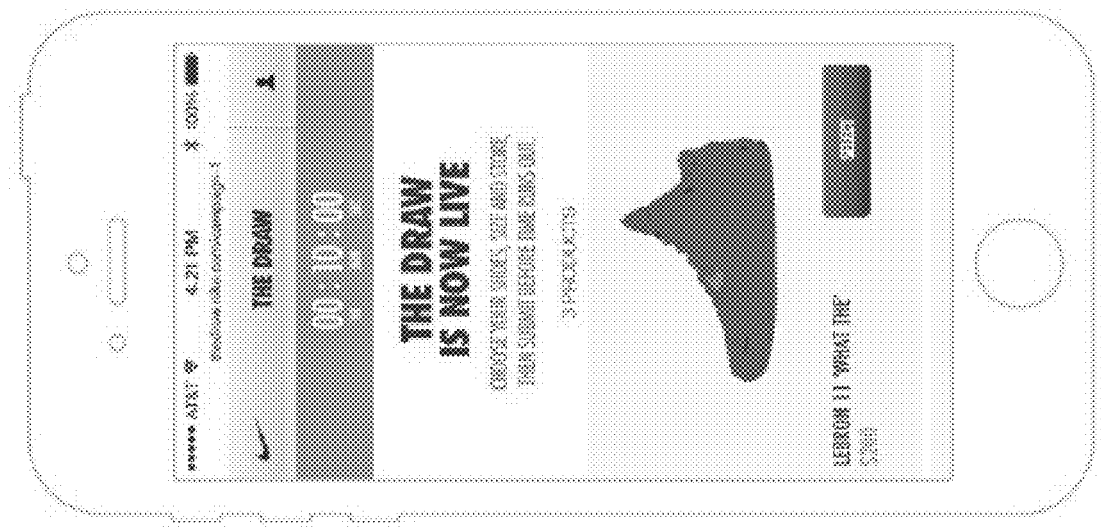

FIGS. 21A-B illustrate example interface screens that may be displayed as a result of the product reservation system initiating a product drawing session. As described above with reference to FIG. 11, a portion of the interface display may include a session timer indicating an amount of time a user has to complete the product drawing session and submit reservation requests. As illustrated in FIGS. 21A and 21B, a user may select the "Select" icon near an image of the exclusive product in order to continue the product drawing session and submit a reservation request for that exclusive product.

Figure 22D:
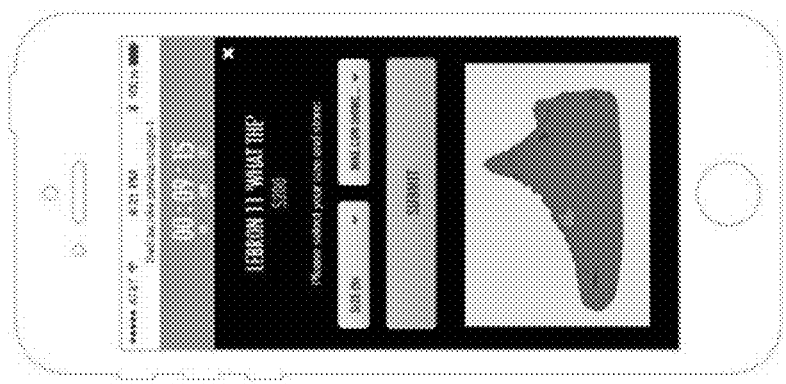
FIGS. 22A-D illustrate example user interface screens and overlays for a product reservation system in accordance with aspects of the disclosure.
Figure 22C:
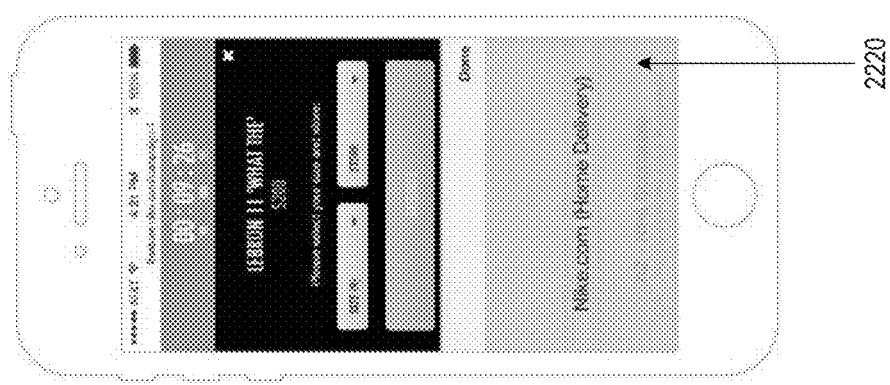
Figure 22B:
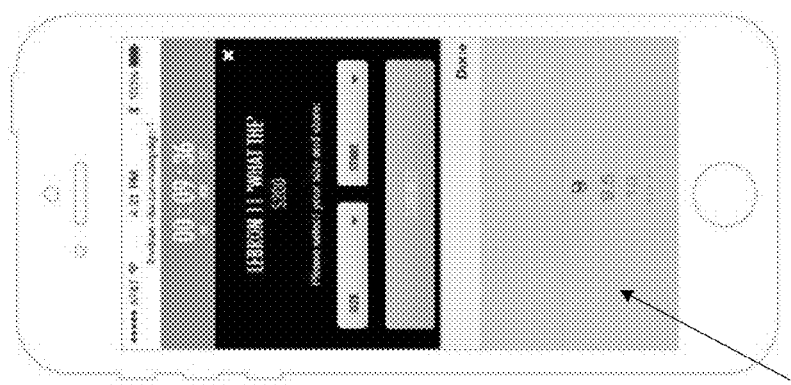
Figure 22A:
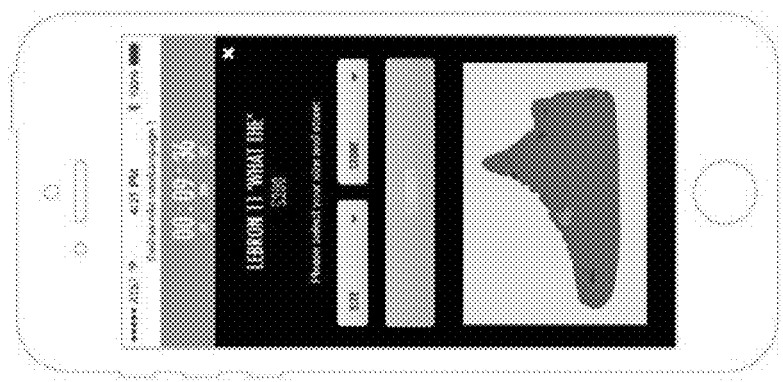

FIG. 22A illustrates an example interface that may be displayed as a result of the user selecting a particular exclusive product to reserve as described above with reference to FIG. 21. As illustrated in FIG. 22A, the interface may include an image of the exclusive product that the user has selected, and may include one or more icons (or interface elements) that may request additional information regarding the exclusive product the user desires to reserve.

For example, the interface may include a "Size" icon (i.e., icon 1210) that, upon selection, displays a list of available product sizes for the footwear product in display area 2210, as illustrated in FIG. 22B. The user may scroll through the different product sizes by swiping the mobile device screen in display area 2210. The product reservation system may communicate with a database or some other data storage (e.g., inventory data store 402) to determine whether a particular size of the requested product is available for purchase at a particular retail store or location. Additionally or alternatively, the interface may include a "Store" icon that, upon selection, displays a list of stores (e.g., retail stores) offering the exclusive product.

The product reservation system may communicate with a database or some other data storage (e.g., inventory data store 402) to determine whether a particular retail store has the requested product in inventory and/or the requested size of the product. As illustrated in FIG. 22C, in some aspects of the disclosure herein, the user may request delivery of the exclusive to a particular address, such as a home address. The user may be directed to a subsequent user interface to provide additional delivery information. The request for information in the interface may be provided to the user in any desired manner or format without departing from this invention, such as via drop-down listings, icons, buttons, etc. After a product size and store (e.g., or other delivery option) has been selected, the user may submit the reservation request by selecting the "Submit" icon in the interface displayed in FIG. 22D.

Figure 23B:
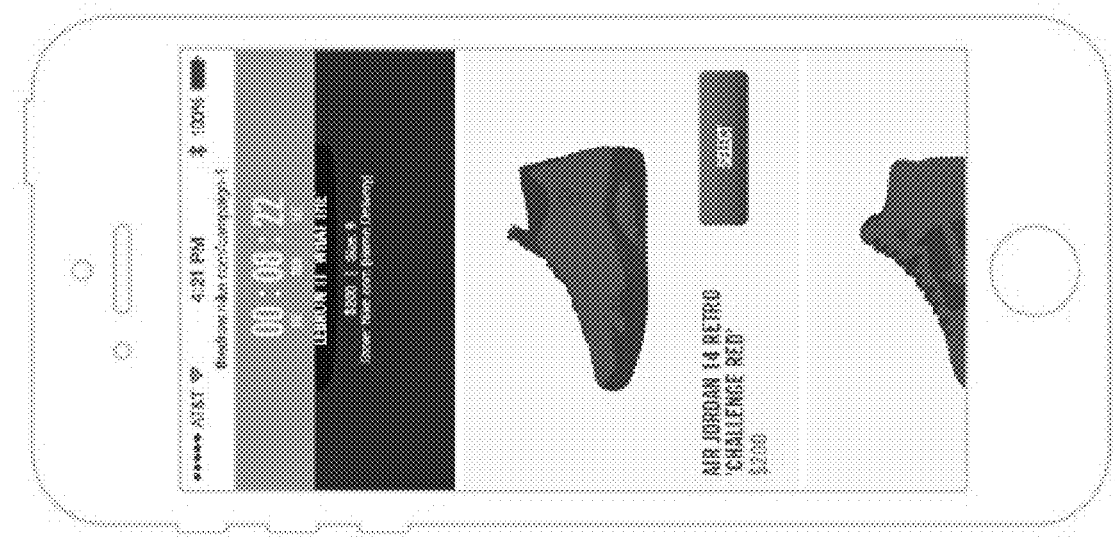
FIGS. 23A-B illustrate example user interface screens for a product reservation system in accordance with aspects of the disclosure.
Figure 23A:
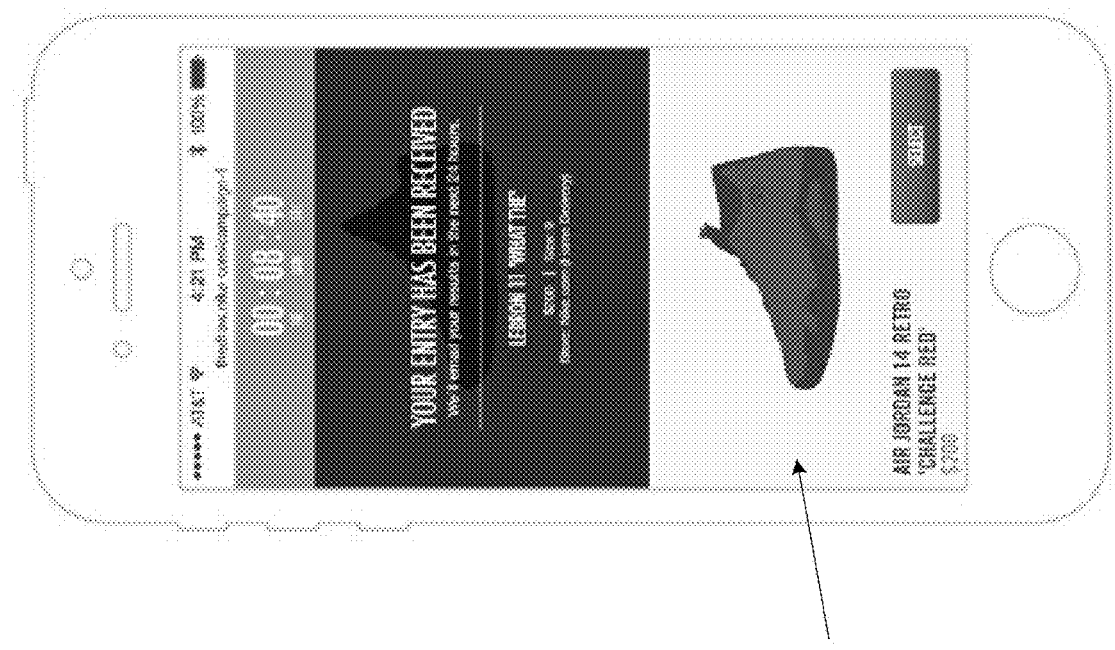
Figure 24D:
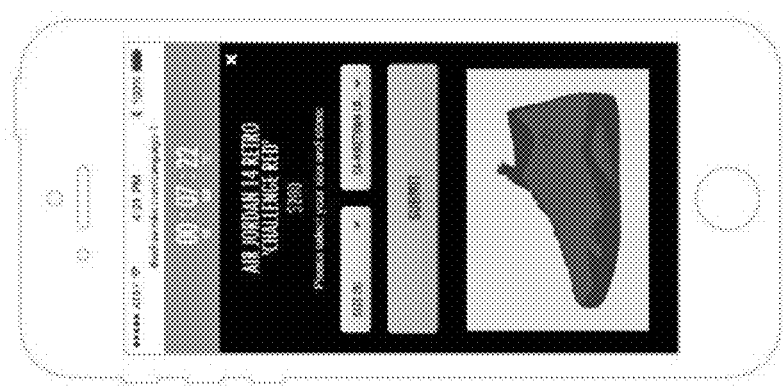
FIGS. 24A-D illustrate example user interface screens and overlays for a product reservation system in accordance with aspects of the disclosure.
Figure 24C:
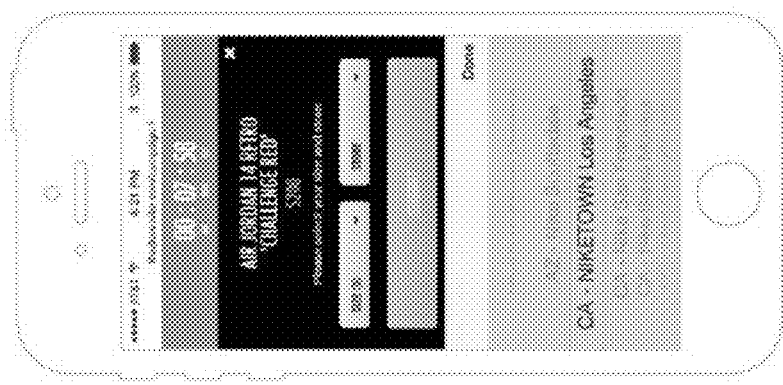
Figure 24B:
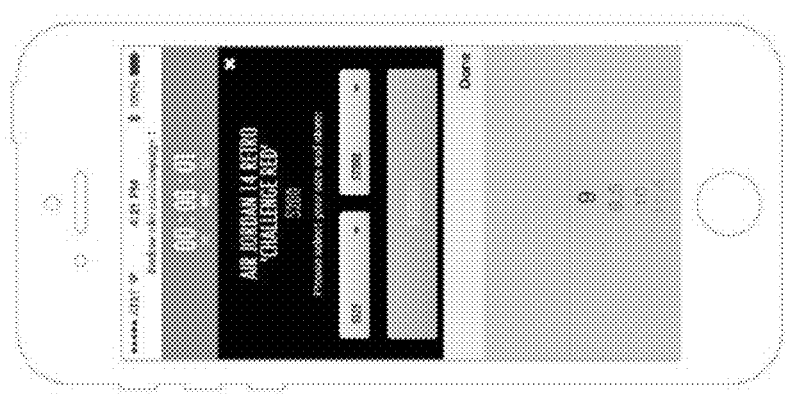
Figure 24A:
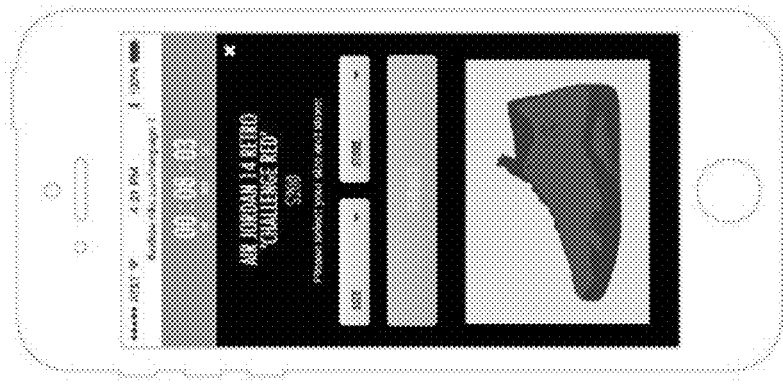

FIGS. 23A-B illustrate example interface screens that may be displayed as a result of the user submitting a reservation request as described above with reference to FIGS. 22A-D. The interface may indicate that a user has submitted a reservation request for a particular product by visually modifying the display area associated with that product. For example, as illustrated in FIG. 23A, the display area associated with the product reserved by the user been modified to be partially obscured (e.g., semitransparent), thus indicating that the reservation request submitted by the user has been received by the product reservation system. Additionally or alternatively, the display area associated with the product reserved by the user may show a message or notification indicating when the user will be notified as to the results of the product drawing. A user may continue to scroll through the interface to select additional products for which the user may submit a reservation request during the product drawing session. For example, FIG. 24A-D illustrate example interfaces that may be displayed as a result of the user selecting the exclusive product shown in display area 2310 in FIG. 23A.

Figure 25C:
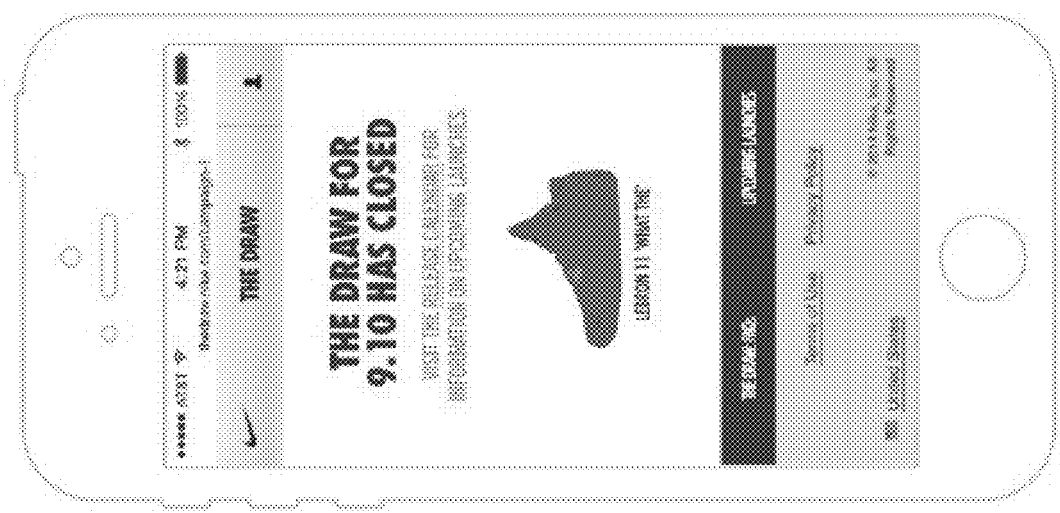
FIGS. 25A-C illustrate example user interface screens for a product reservation system in accordance with aspects of the disclosure.
Figure 25B:
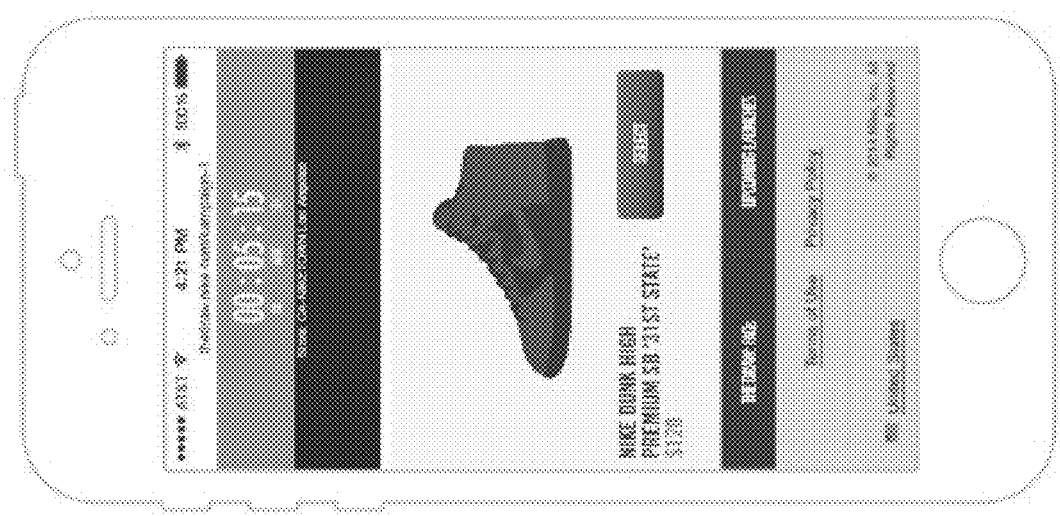
Figure 25A:
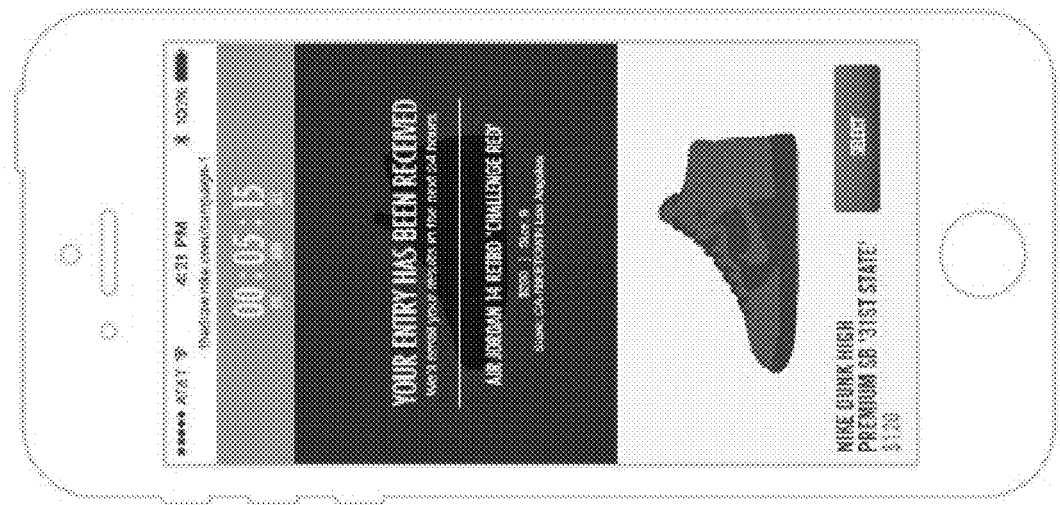

FIGS. 25A-B illustrate an example interface that may be displayed as a result of the user submitting a reservation request as described above with reference to FIGS. 24A-D. In some embodiments, upon expiration of the session timer displayed in the interface display, the user may be directed to a user interface display indicating that the product drawing session has ended. For example, as illustrated in FIG. 25C, the interface displays a message to the user indicating that the product drawing session has closed.

CONCLUSION

While the invention has been described with respect to specific examples including presently preferred modes of carrying out the invention, those skilled in the art will appreciate that numerous variations and permutations of the above described systems and techniques may be made without departing from this invention. For example, the systems, methods, and/or user interfaces may include more, less, and/or different functionality from that described above, and the various features of the systems, methods, and/or user interfaces may be activated or interacted with in various different manners (e.g., using different types of interface elements) from those described above. Also the various process steps may be changed, changed in order, some omitted, and/or include additional steps or features without departing from this invention. Various changes and modifications to the systems, methods, and user interfaces may be made without departing from the spirit and scope of the invention, as set forth in the appended claims.

What is claimed is:

1. A method comprising:
   broadcasting, by a computing device, a message to a plurality of users, wherein the message indicates an opportunity to participate in a drawing for a product;
   receiving, by the computing device, a plurality of reservation requests from a first set of users of the plurality of users;
   obtaining, from a supply chain management system, inventory data for the product;
   determining, by the computing device and based on the inventory data, data indicating a demand for the product;
   adjusting, by the computing device and based on the demand data, an allocation of inventory for the product;
   determining, using geographic locations associated with each of the first set of users, a second set of users;
   processing, by the computing device, the plurality of received reservation requests associated with the second set of users, the demand data, and the inventory data to determine one or more winners of the drawing;
   after identifying a first traffic pattern in the plurality of received reservation requests, replicating one or more resource modules to facilitate the receiving and processing of the plurality of received reservation requests; and
   transmitting a notification to a plurality of electronic devices associated with the one or more winners of the drawing.

2. The method of claim 1, further comprising:
   retrieving data representing a reservation request history for a first user; and
   generating a product recommendation for the first user based at least in part on the retrieved data.

3. The method of claim 1, wherein the processing, by the computing device, the plurality of received reservation requests associated with the second set of users further comprises:
   determining whether a threshold number of reservations requests have been received during a predetermined time period.

4. The method of claim 1, further comprising:
   determining, based on the one or more winners, updated inventory data for the product; and
   transmitting, to a remote computing device, the updated inventory data, wherein the remote computing device is located at a retail store.

5. The method of claim 1, further comprising:
   selectively identifying at least a first user in the plurality of users to receive the message based at least in part on the first user achieving an activity milestone.

6. The method of claim 5, wherein the activity milestone comprises exceeding at least one of a first threshold level of activity points or a first threshold level of athletic activity.

7. The method of claim 1, further comprising:
determining that a first user in the plurality of users issued an activity challenge to a second user in the plurality of users;
determining a winner of the activity challenge; and
receiving, from the winner of the activity challenge, a first reservation request.

8. The method of claim 1, further comprising:
selectively identifying at least a first user in the plurality of users to receive the message based at least in part on a threshold proximity of the first user to a first location.

9. The method of claim 1, wherein the message is broadcasted via a social networking service.

10. The method of claim 1, wherein processing the plurality of received reservation requests further comprises:
comparing at least one product performance attribute received in a first reservation request to product attributes of available inventory for the product.

11. The method of claim 1, wherein processing the plurality of received reservation requests further comprises: ranking users based at least in part on athletic activity data obtained from the first set of users.

12. The method of claim 1, wherein the message includes at least one of a date for or a duration of the drawing.

13. The method of claim 1, further comprising:
transmitting, to the supply chain management system, the adjusted inventory allocation for the product.

14. The method of claim 1, further comprising:
providing an on-screen interface for a user, of the plurality of users, to submit a reservation request; and
adjusting, based on the inventory data, a first interface element of the on-screen interface.

15. A product reservation system comprising:
one or more processors programmed with computer-executable instructions, that when executed, cause a computing device to perform functions through a plurality of modules comprising at least:
a product reservation module programmed to cause the computing device to initiate a broadcast of a message to a plurality of users, wherein the message indicates an opportunity to participate in a drawing for a product;
a reservation request collection module programmed to cause the computing device to receive a plurality of reservation requests from a first set of users of the plurality of users;
a reservation request processing module programmed to cause the computing device to:
obtain, from a supply chain management system, inventory data for the product;
determine, based on the inventory data, data indicating a demand for the product;
adjust, based on the demand data, an allocation of inventory for the product;
determine, using geographic locations associated with each of the first set of users, a second set of users; and
process the plurality of received reservation requests associated with the second set of users, the demand data, and the inventory data to determine one or more winners of the drawing,
wherein the product reservation module is further programmed to cause the computing device to:
transmit a notification to a plurality of electronic devices associated with the one or more winners of the drawing; and
wherein the computer-executable instructions, when executed, further cause the computing device to:
after identifying a first traffic pattern in the plurality of received reservation requests, replicate one or more of the plurality of modules to facilitate the receiving and processing of the plurality of received reservation requests.

16. The product reservation system of claim 15, wherein the instructions, when executed, further cause the computing device to:
selectively identify at least a first user in the plurality of users to receive the message based at least in part on the first user achieving an activity milestone.

17. The product reservation system of claim 15, wherein the instructions, when executed, further cause the computing device to:
selectively identifying at least a first user in the plurality of users to receive the message based at least in part on a threshold proximity of the first user to a first location.

18. The product reservation system of claim 15, wherein the instructions, when executed, further cause the computing device to:
rank users based at least in part on athletic activity data obtained from the one or more users.

19. The product reservation system of claim 15, wherein the instructions, when executed, further cause the computing device to:
compare at least one product attribute received in a first reservation request to product attributes of available inventory for the product.

20. The product reservation system of claim 15, wherein the instructions, when executed, further cause the computing device to:
retrieve supply chain data from a supply chain management system.

* * * * *